July 20, 1965
W. S. RAYNOR
3,195,741
ARTICLE UNSTACKING APPARATUS
Original Filed Sept. 9, 1960
11 Sheets-Sheet 1
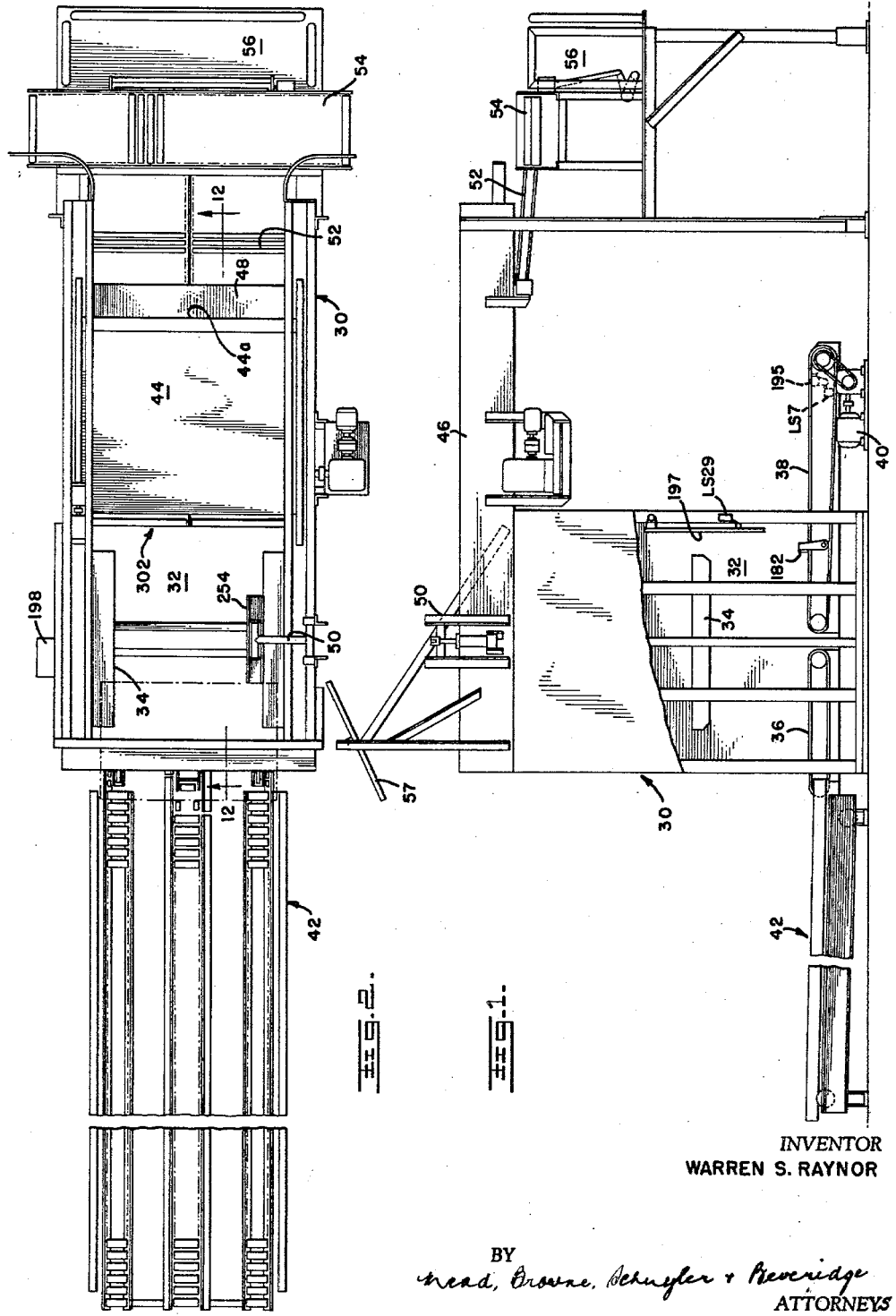
INVENTOR
WARREN S. RAYNOR
BY
*Mead, Browne, Schuyler + Beveridge*
ATTORNEYS

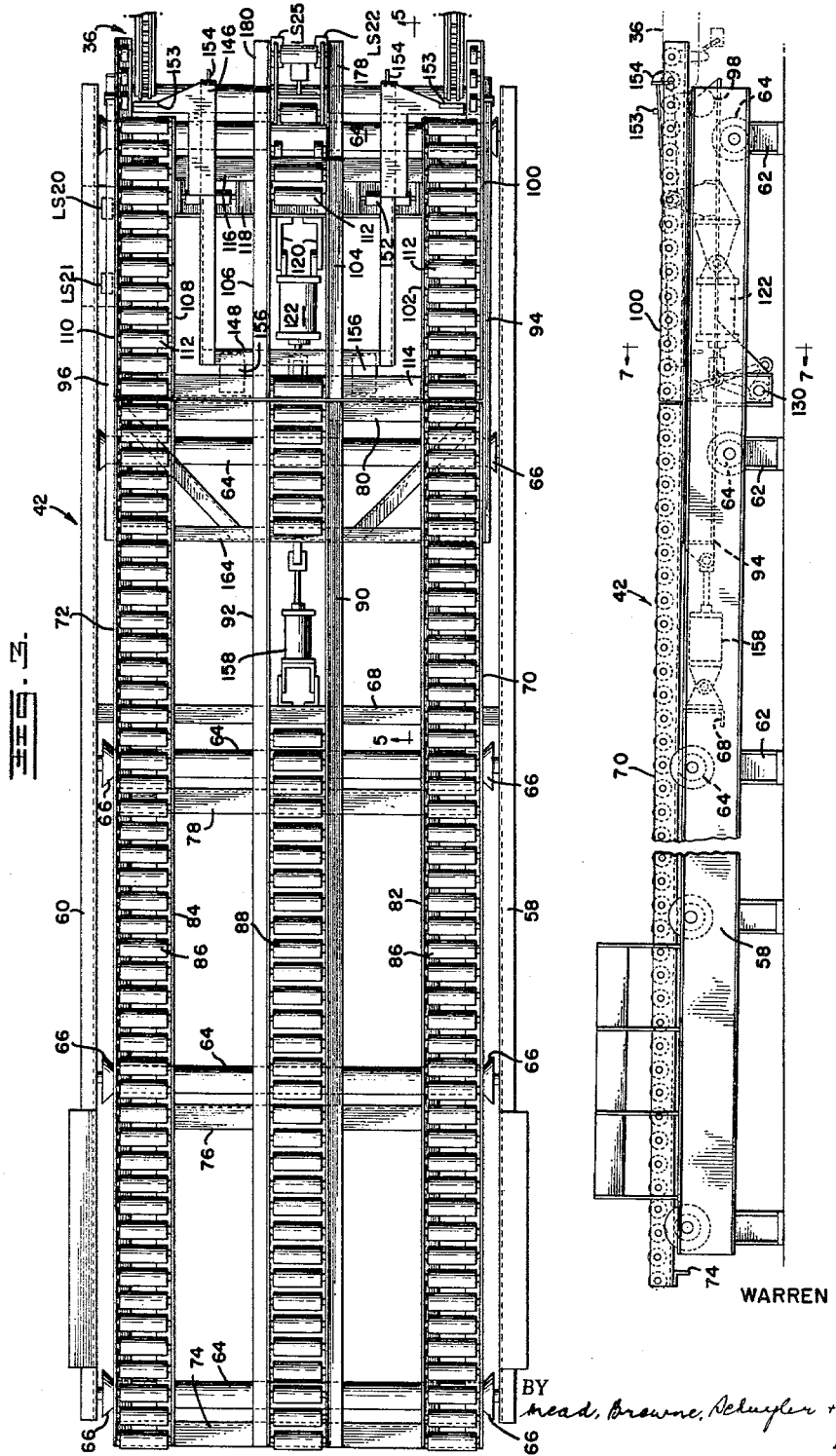

July 20, 1965 W. S. RAYNOR 3,195,741
ARTICLE UNSTACKING APPARATUS
Original Filed Sept. 9, 1960 11 Sheets-Sheet 3
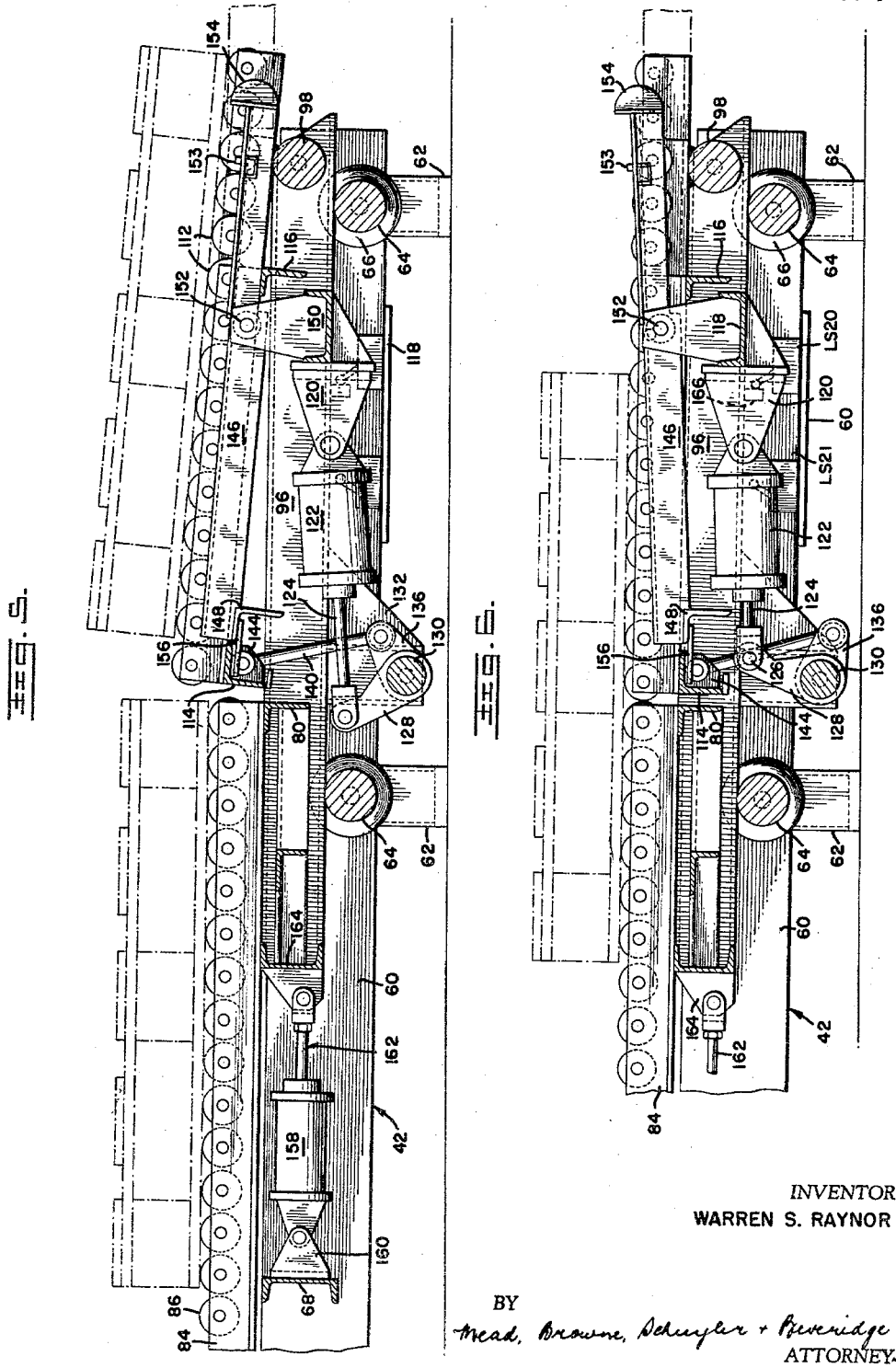
INVENTOR
WARREN S. RAYNOR
BY
Mead, Browne, Schuyler + Beveridge
ATTORNEYS

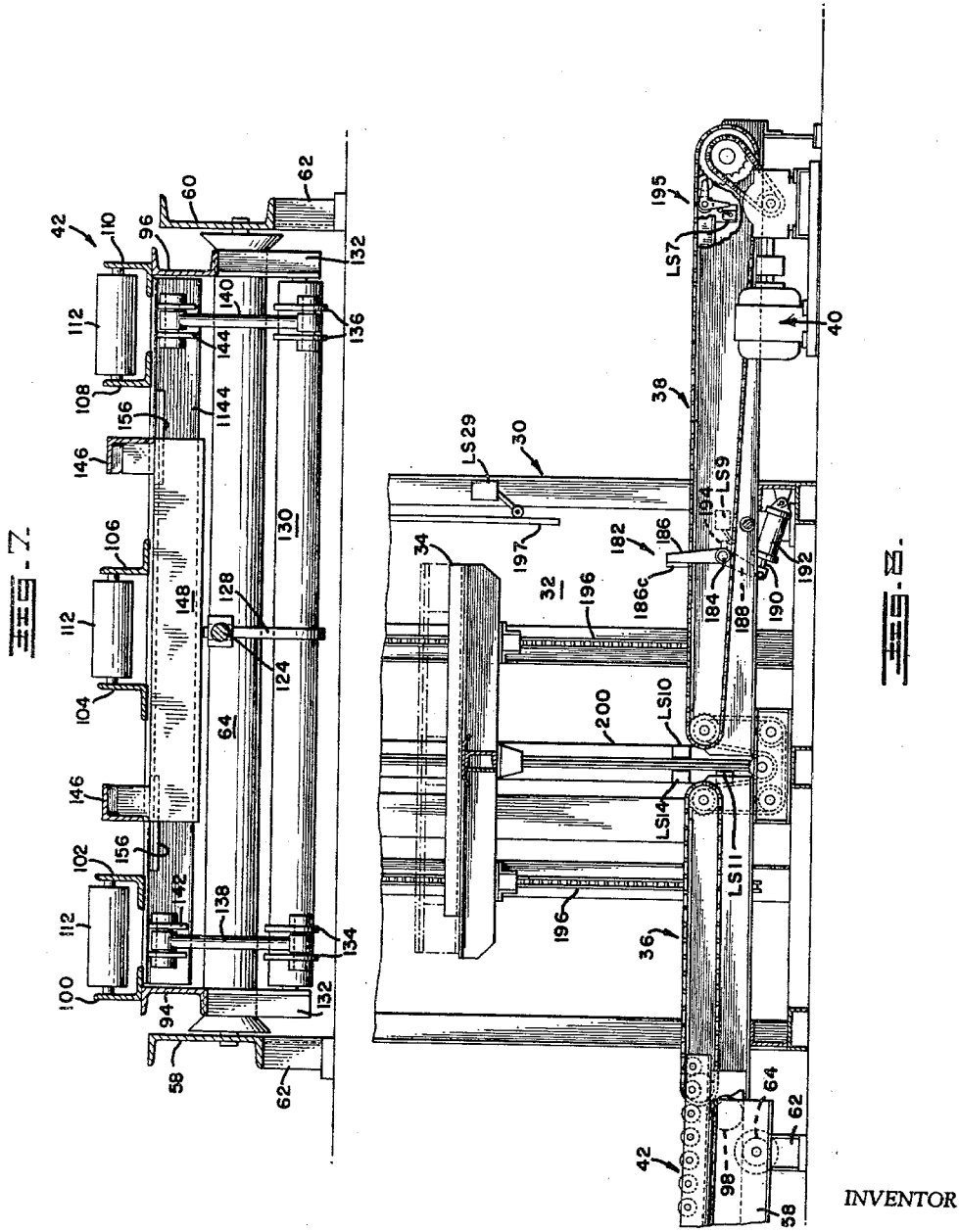

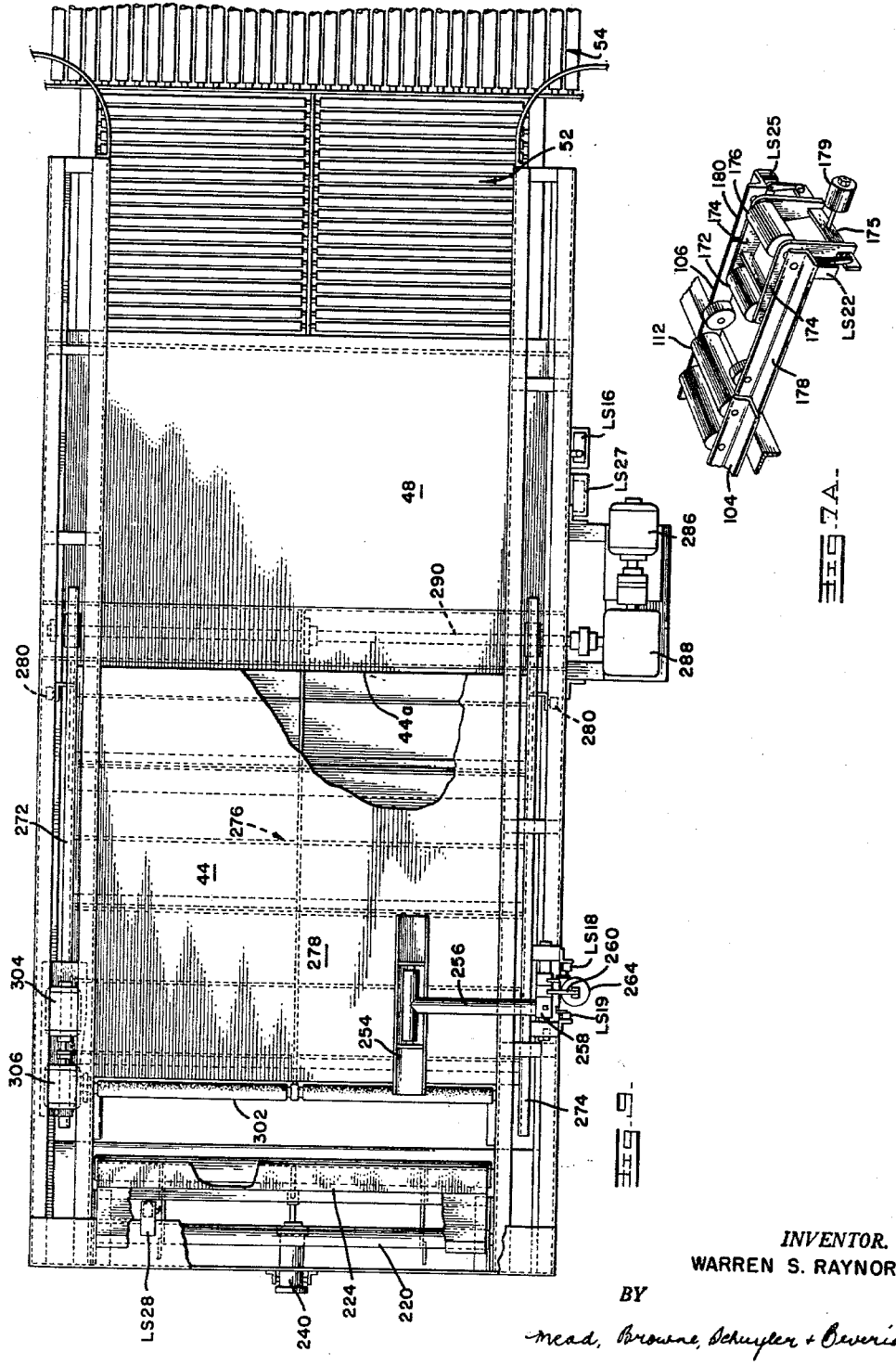

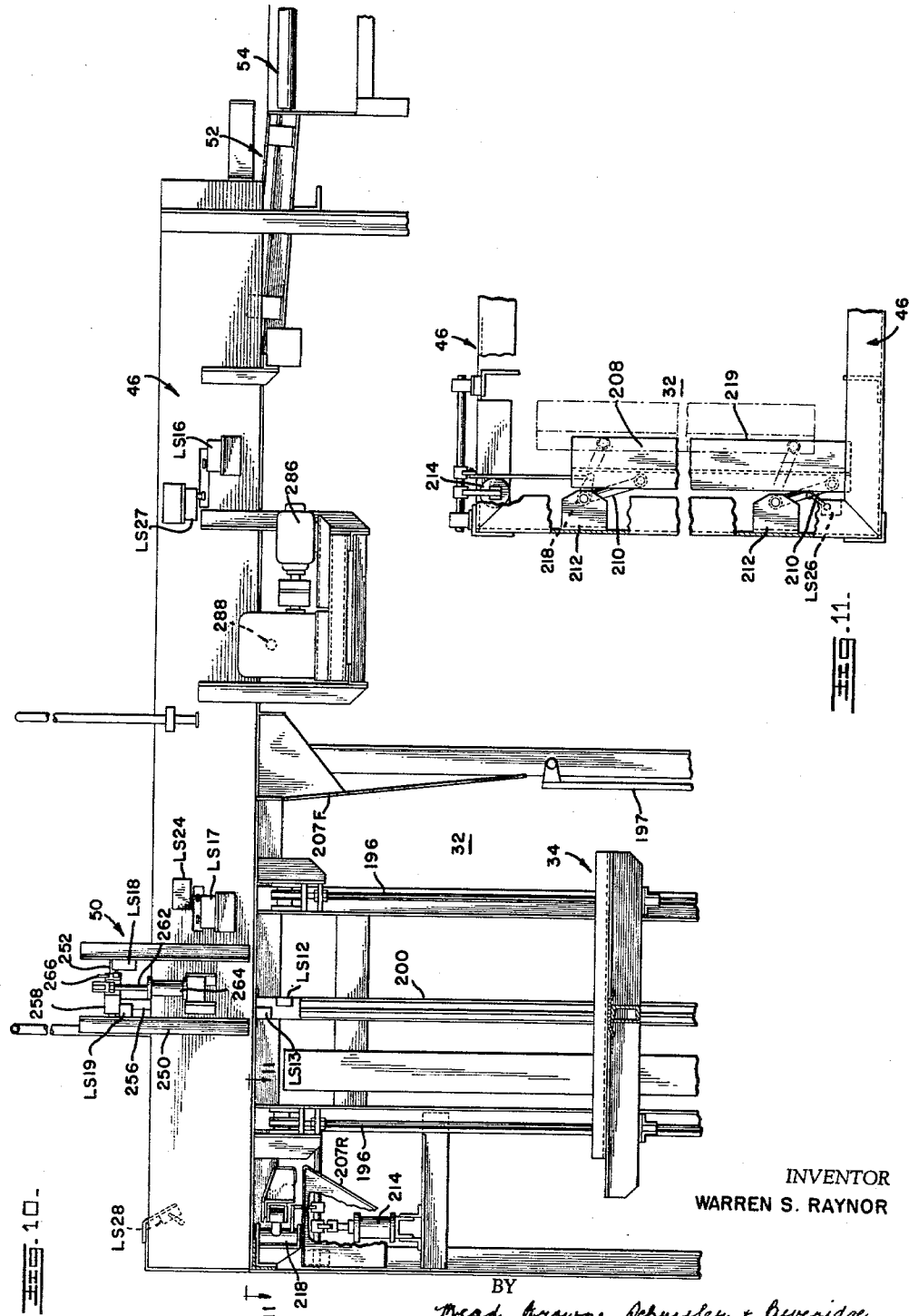

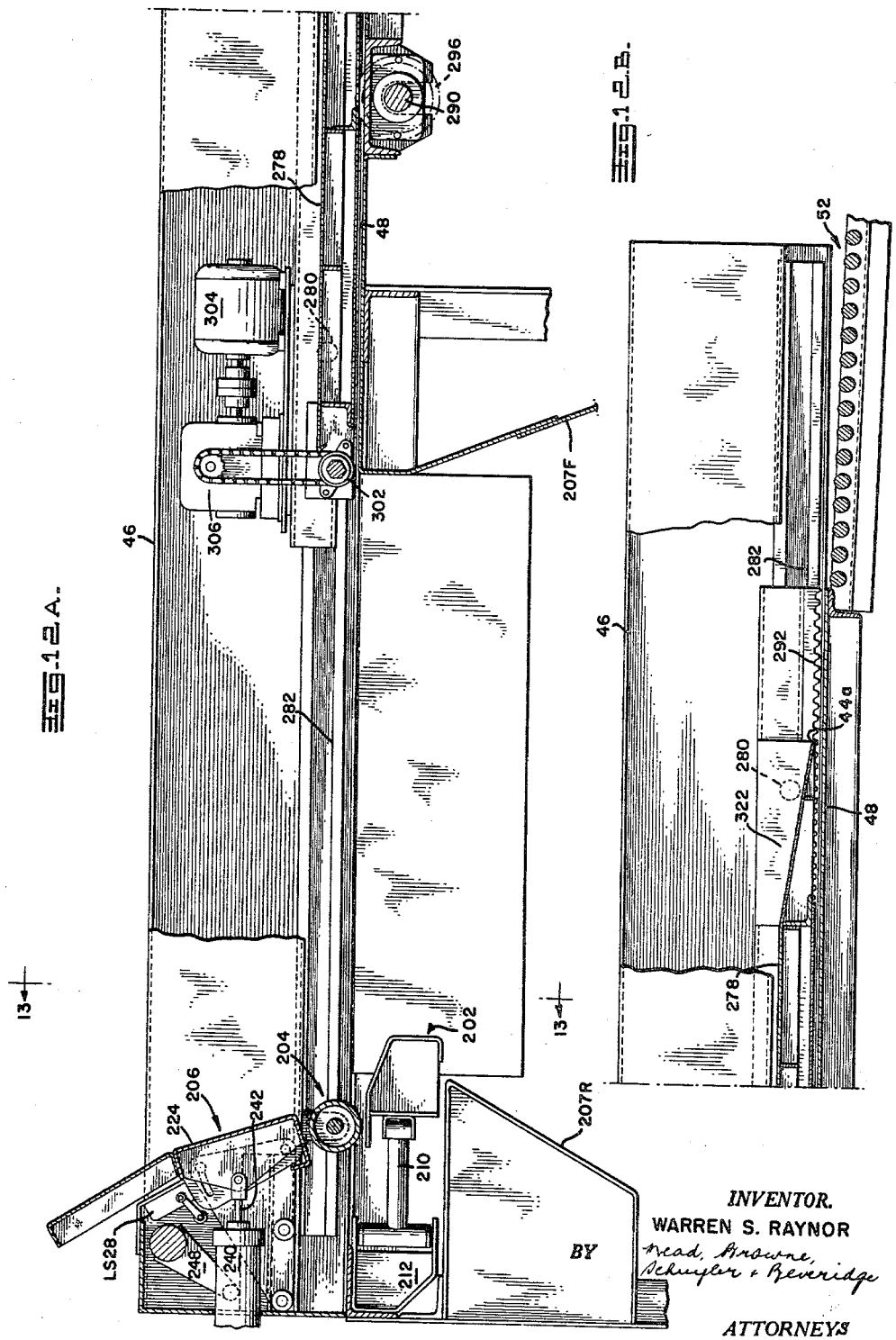

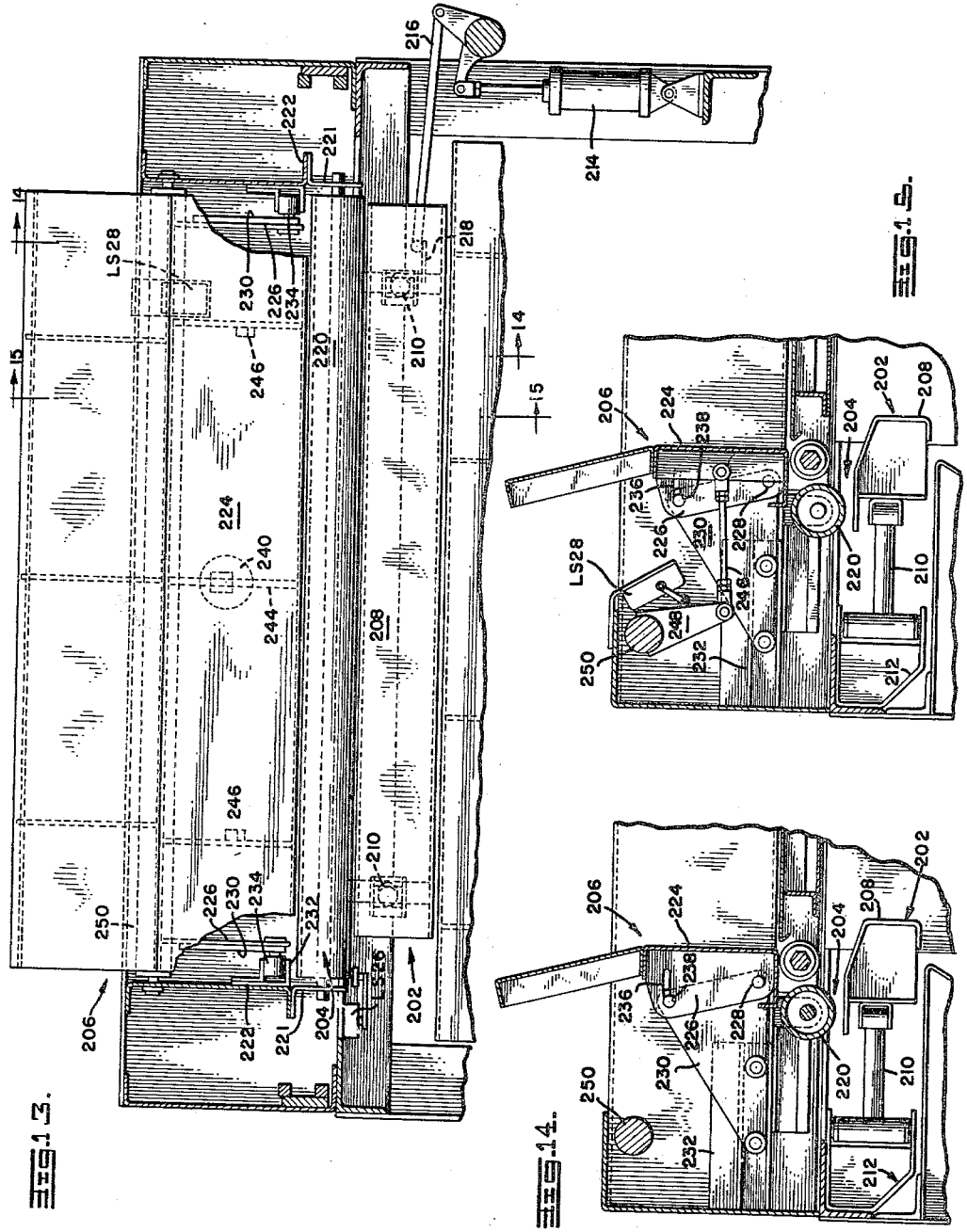

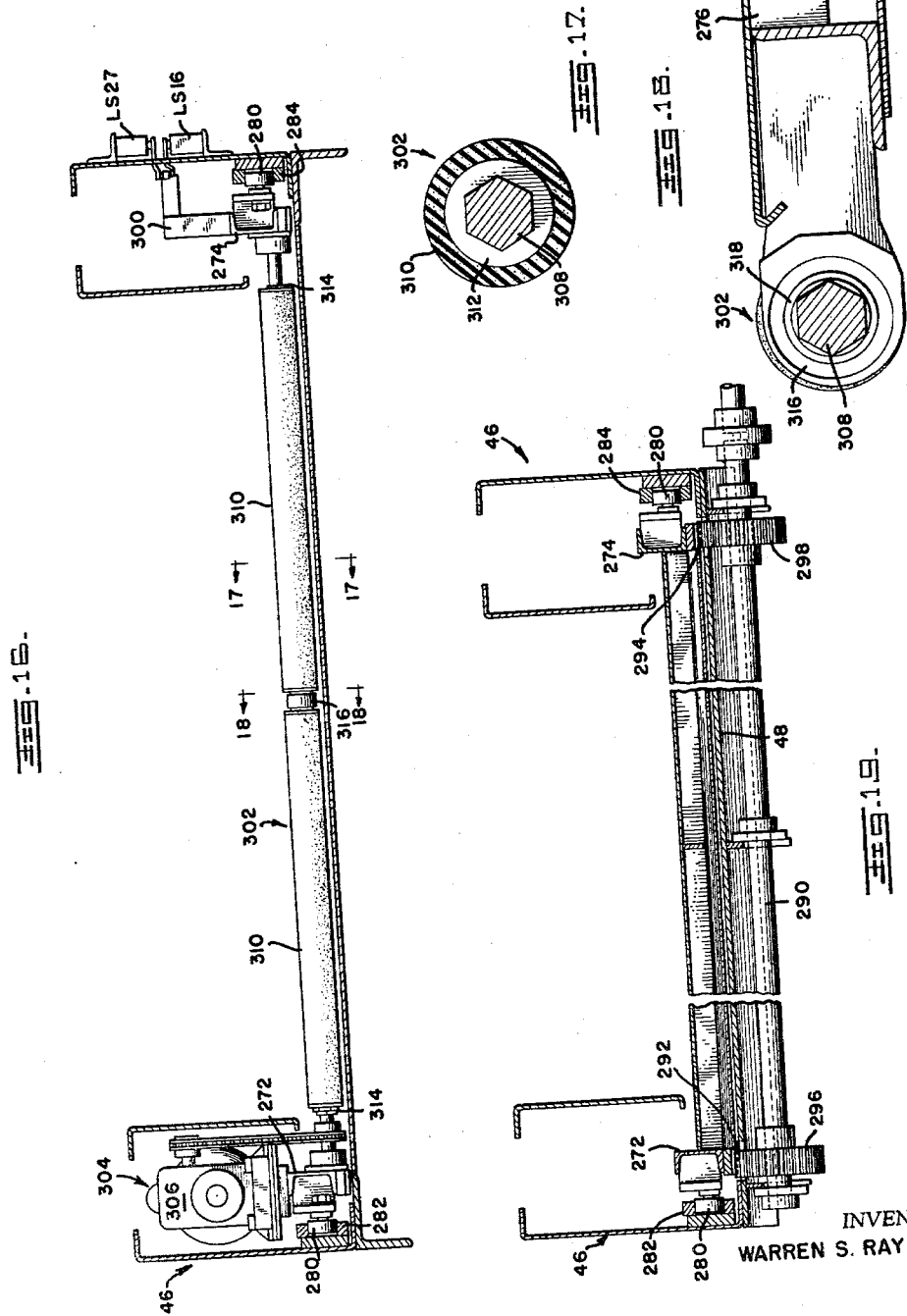

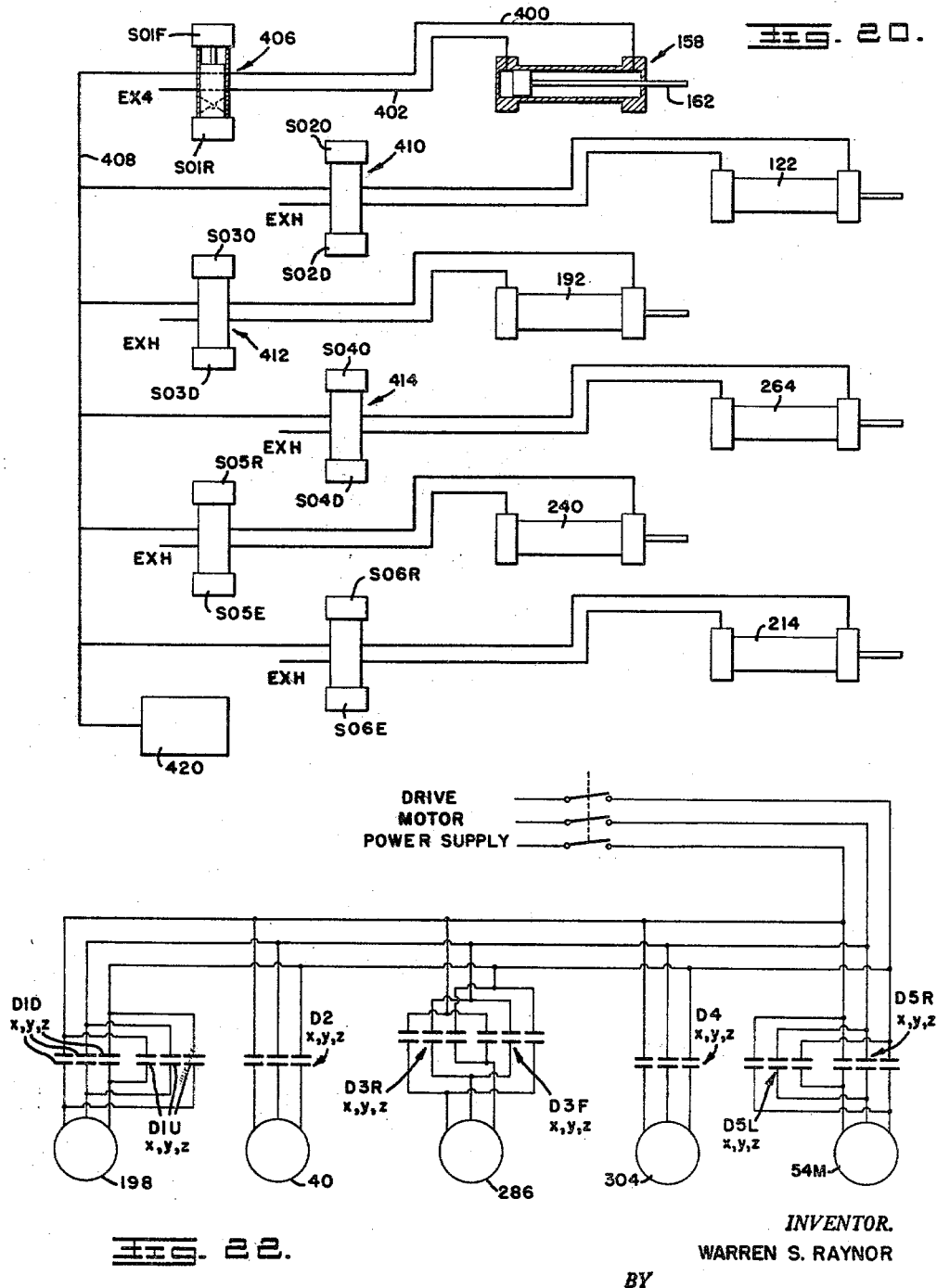

INVENTOR.
WARREN S. RAYNOR
BY
Mead, Browne, Schuyler & Beveridge
ATTORNEYS

3,195,741
ARTICLE UNSTACKING APPARATUS
Warren S. Raynor, Port Hope, Ontario, Canada, assignor to Mathews Conveyer Company, Ellwood City, Pa., a corporation of Pennsylvania
Continuation of application Ser. No. 54,997, Sept. 9, 1960. This application Nov. 28, 1962, Ser. No. 246,645
18 Claims. (Cl. 214—8.5)

This invention relates to article unstacking apparatus, and more particularly to apparatus especially adapted to unstack articles such as cartons stacked in layers into a unit load.

The practice of transporting or handling large quantities of cartons in unit loads consisting of a multi-layered stack, frequently supported on a pallet has become quite widespread in recent years since such unit loads may be readily transported from place-to-place by fork-lift trucks. The advantages of this practice are such that many machines have been developed to assemble cartons into a unit load.

In certain industries, of which the bottled beverage industry is a primary example, the production plant must not only prepare unit loads for shipping or warehousing, but also receives substantial quantities of cartons which are likewise in the form of a unit load. In the bottled beverage industry the bottling plant continuously receives unit loads of empty bottles. In the larger plants, the cartons of used empty bottles are often stacked manually upon pallets as they are collected from stores, warehouses, etc., so that the cartons with empty bottles may be transported within the bottling plant by fork-lift trucks. Shipments of new bottles are frequently received in cartons stacked in unit loads. In either case, the unit load must be unstacked within the plant. Manual handling and unloading of returned cartons of empty bottles requires a substantial labor force.

Accordingly, it is a primary object of this invention to provide apparatus for unloading cartons or similar articles stacked in layers.

It is another object of the invention to provide article unstacking apparatus for disassembling a unit load of articles stacked in layers by cyclically removing the uppermost layer from the stack.

Another object of the invention is to provide article unstacking apparatus in which the uppermost layer of a stack of articles is positioned within the path of an apron which is passed successively through the stack into supporting engagement with the uppermost layer and subsequently retracted to remove the uppermost layer of articles from the stack.

Still another object of the invention is to provide apparatus for feeding stacks of articles to the unstacking apparatus automatically in accordance with the requirements of the apparatus.

In the achievement of the foregoing, and other objects, a machine embodying the present invention includes a lift which is operable to raise and lower a stack or unit of articles within a lift shaft defined by a fixed frame. A stack handling conveyer passes through the lift shaft immediately above the position assumed by the lift at its lower limit of travel. Loaded pallets or stacks of articles are fed onto the stack handling conveyer from a storage conveyer upon which the stacked articles are loaded directly from a fork-lift truck or other means. The storage conveyer is a reciprocating gravity conveyer which is continuously reciprocated to maintain a continuous line of successive article stacks in abutting relationship rearwardly of a stop located at the discharge end of the storage conveyer.

At the discharge end of the reciprocating gravity conveyer, a tilting discharge section is operable, when the lift is at its lowermost limit, to tilt upwardly and retract the stop to gravitationally discharge the endmost stack onto the stack handling conveyer. Movement of the reciprocating gravity conveyer is stopped until the transferred stack reaches a location on the stack handling conveyer above the lift.

The stack handling conveyer is power driven and as the stack is conveyed toward the lift, a pallet upon which the preceding stack was supported is conveyed out the opposite side of the lift shaft. The arrival of the new stack in position above the lift automatically starts movement of the reciprocating gravity conveyer and simultaneously lowers the tilting section to permit the line of loaded pallets or article stacks to move down one step until the endmost stack engages the stop.

Arrival of the new stack in position above the lift automatically energizes the lift driving motor to elevate the lift upwardly within the shaft until the uppermost layer is positioned in the path of movement of a reciprocable apron which, during the raising of the lift is located clear of one side of the lift shaft.

When the uppermost layer of articles is located at the correct position, the apron is driven outwardly into the shaft and its leading edge engages the sides of the uppermost layer of articles slightly above the bottom of the articles.

A roller is mounted on the leading edge of the apron and driven in rotation about a horizontal axis extending transversely across the leading edge of the apron. The roller is driven in a direction such that the leading side of the roller is driven upwardly while its upper surface is driven rearwardly of the apron. Thus the roller exerts a force upon articles which it engages which moves the articles upwardly and rearwardly onto the upper surface of the apron. Effectively, the apron is passed through the stack beneath the uppermost layer of articles.

On the side of the lift shaft opposite the apron, a stationary back-up member engages the rear side of the uppermost layer to prevent movement of the layer away from the apron as it is driven toward the stationary back-up member. As the apron moves toward its extended position, an alignment member located below the stationary back-up member is reciprocated outwardly into the lift shaft to locate the rear side of the next uppermost layer of articles in front of the stationary back-up member.

To assist in moving the layer of articles onto the surface of the apron, a reciprocating and tilting back-up member is mounted above the stationary back-up member. As the apron approaches its fully extended position the movable back-up member is reciprocated outwardly over the upper surface of the apron to drive the layer of articles further onto the apron surface and is tilted upwardly and rearwardly to permit the rearwardmost cartons to tilt about the stationary back-up member as they "climb" up onto the upper surface of the apron. The apron is then driven back to its retracted position.

When the apron arrives in its fully retracted position, the lift drive motor is again energized to elevate the lift one step to position the next uppermost layer of articles in position to be acted upon by the apron. The foregoing cycle is repeated. The transferring of the second layer from the stack onto the surface of the apron pushes the previously moved layer off the rear edge of the apron onto an accumulation table located immediatly below the path of movement of the apron. As the apron returns with the second layer from its fully extended position, the rear edge of the apron engages the layer of articles now supported upon the accumulation table and drives the articles from the accumulation table onto a gravity conveyer section. A power driven conveyer is located at the lower end of the gravity conveyer section and extends transversely across the gravity conveyer. An operator beside the gravity conveyer manually aligns the articles on the power driven conveyer so that the articles are conveyed away from the machine in single line.

When the last layer has been removed from the lift, the lift is lowered again to its lower end limit. Arrival of the lift at its lower end limit energizes the stack handling conveyer and also actuates the discharge mechanism of the reciprocating gravity conveyer to transfer another stack to the stack handling conveyer. As the second loaded pallet or article stack moves toward the lift, the unloaded pallet, if the preceding stack was supported by a pallet, is driven by the stack handling conveyer outwardly clear of the lift shaft.

Other objects and features of the invention will become apparent by reference to the following specification taken in conjunction with the accompanying drawings.

In the drawings:

FIG. 1 is a side elevational view of a machine embodying the present invention with certain parts broken away or omitted for the sake of clarity;

FIG. 2 is a plan view of the machine of FIG. 1;

FIG. 3 is a plan view of the reciprocating gravity storage conveyer;

FIG. 4 is a side elevational view of the conveyer shown in FIG. 3;

FIG. 5 is a detail cross-sectional view of the discharge end of the reciprocating gravity conveyer taken on the line 5—5 of FIG. 3;

FIG. 6 is a view similar to FIG. 5 showing the discharge section in its normal rest position;

FIG. 7 is a cross-sectional view of the reciprocating gravity conveyer taken on the line 7—7 of FIG. 4;

FIG. 7A is an isometric view of the floating roller assembly at the infeed end of the power driven conveyer;

FIG. 8 is a detail cross-sectional view showing the lower portion of the lift shaft and the pallet handling conveyer and associated structure;

FIG. 9 is a plan view of the machine, with certain parts broken away;

FIG. 10 is a side elevational view of the upper portion of the lift shaft with certain parts broken away for the sake of clarity;

FIG. 11 is a detail cross-sectional view taken on the line 11—11 of FIG. 10;

FIG. 12A is a vertical cross-sectional view taken on the line 12—12 of FIG. 2;

FIG. 12B is a cross-sectional view showing an extension of the structure of FIG. 12A;

FIG. 13 is a vertical cross-sectional view taken on the line 13—13 of FIG. 12A;

FIG. 14 is a cross-sectional view taken at the location indicated by the line 14—14 of FIG. 13 showing the reciprocating back-up member in its fully extended position and the apron in its fully extended position;

FIG. 15 is a cross-sectional view taken on the location indicated by the line 15—15 of FIG. 13 showing the various parts in the same position as FIG. 14;

FIG. 16 is a detail cross-sectional view showing details of the leading edge of the apron assembly and its support means;

FIG. 17 is a cross-sectional view taken on the line 17—17 of FIG. 16;

FIG. 18 is a cross-sectional view of the leading edge of the apron taken on the line 18—18 of FIG. 16;

FIG. 19 is a transverse cross-sectional view showing details of the apron drive mechanism;

FIG. 20 is a schematic diagram of the pneumatic control system employed by the machine of FIGS. 1 through 19;

FIG. 22 is a schematic diagram of another portion of the electrical control system.

Figure 21:
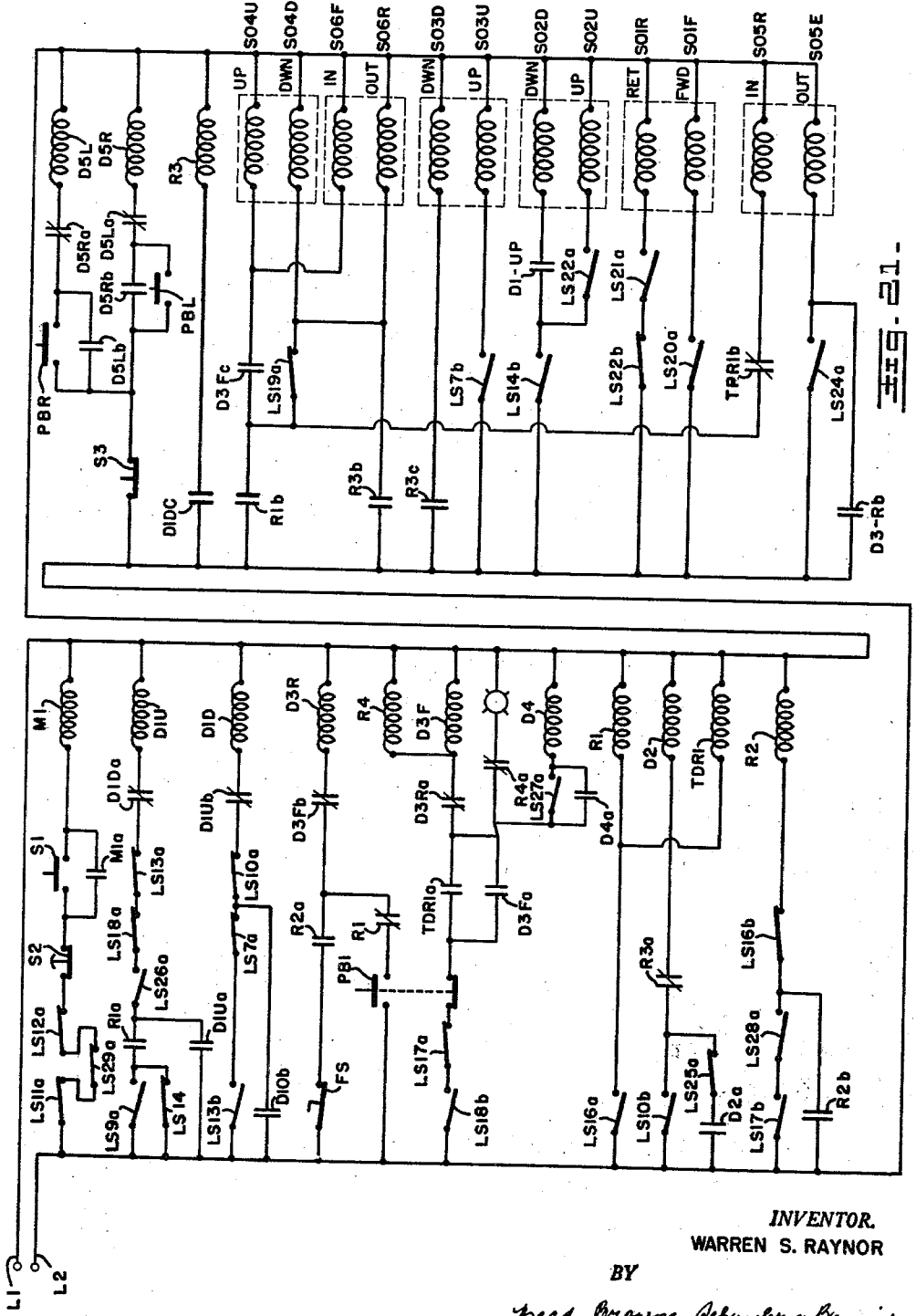
FIG. 21 is a schematic diagram of one portion of the electrical control system of the machine.

The general organization of the machine may be best appreciated by reference to FIGS. 1 and 2 of the drawings. The machine includes a frame designated generally 30 which defines a vertical shaft 32 within which a lift platform 34 is raised and lowered by apparatus described more fully in my copending application Serial No. 728,243 filed April 14, 1958. Although the machine described in application Serial No. 728,243 and the embodiment described herein refer to unit loads or stacks of articles supported on a pallet, the use of a pallet is not essential to the instant invention and it will become apparent that the presence or absence of a pallet has no influence on the unstacking operation. Extending through the lower end of lift shaft 32 is a pallet handling conveyer which includes an infeed section 36 and a discharge section 38 both of which are driven simultaneously from a motor and reducer assembly indicated at 40. Loaded pallets are fed onto infeed section 36 from a reciprocating gravity conveyer designated generally at 42 which has stop means (not shown in FIGS. 1 and 2) operable to release one loaded pallet at a time to infeed conveyer 36 when lift platform 34 is disposed in its lowermost position. The lowermost position of lift platform 34 locates the platform below the upper surfaces of conveyer sections 36 and 38.

An apron assembly 44 is mounted for horizontal reciprocating movement upon an elevated portion 46 of frame 30. In FIG. 2, apron 44 is shown in its retracted position wherein the apron is located clear of one side of lift shaft 32 and overlies an accumulation table partially shown at 48 which extends to the position immediately beneath the left-hand edge of apron 44 in FIG. 2. Control means for indexing the lift upwardly to position successive uppermost layer of articles in the path of movement of apron 44 includes a lift control arm 50 mounted at the upper end of lift shaft 32. At the right-hand end of accumulation table 48 a gravity conveyer section 52 is inclined downwardly from the right-hand end of accumulation table 48 to the conveying surface of a reversible powered roll conveyer 54. At the opposite side of conveyer 54, an operator's platform 56 is located from which an operator can conveniently guide articles onto conveyer 54.

A mirror 57 is mounted above the pallet lift shaft to permit the machine operator to observe cartons supported within the lift shaft to prevent jams in the event that cartons on the lift are misaligned.

*Storage conveyer assembly*

The function of storage conveyer assembly 42 is to receive loaded pallets intermittently, as from forklift trucks, to form the loaded pallet into a line in which the pallets are in head-to-tail relationship, and to supply a single loaded pallet at a time to infeed conveyer section 36 when the pallet lift is in position to receive the loaded pallet. The structural details of storage conveyer assembly 42 are best shown in FIGS. 3 through 8 of the drawings.

Referring first to FIGS. 3 and 4, storage conveyer 42 includes a pair of spaced parallel side rails 58 and 60 which are fixedly mounted upon suitably located support members such as 62 so that side rails 58 and 60 form a longitudinally extending rigid framework which is inclined downwardly to the right in the fashion best seen in FIG. 4. At longitudinally spaced locations, a plurality of support rollers 64 are rotatably supported between side rails 58 and 60 for rotation about horizontal axes extending transversely between the side rails. Near each outer end of each roller 64, an outwardly flaring conical flange 66 is formed to guide a reciprocating frame supported upon rollers 64 in movement longitudinally of side rails 58 and 60. As best seen in FIG. 4, rollers 64 are so located as to define a supporting surface which is inclined downwardly toward the right in FIG. 4. The two rollers 64 located adjacent the right-hand end of the side rails in FIG. 4 are offset downwardly to accommodate the shape of the reciprocating frame which will be described in greater detail below. In addition to rollers 64, a rigid cross-frame member 68 is secured, as by welding, between side frame members 58 and 60 approximately midway between the ends of the members. The structure described thus far may be considered to be the fixed frame or base of a reciprocating gravity conveyer in that all of the parts described are fixedly mounted and do not move, with the exception of the rotation of the various rollers 64 about their axes.

The reciprocating frame of conveyer 42 is mounted upon rollers 64 and includes a pair of spaced parallel outer side frame members 70 and 72 which are rigidly connected to each other by four transversely extending cross-frame members 74, 76, 78 and 80 welded between members 70 and 72. Longitudinally extending frame members 82 and 84 are spaced inwardly from the respective frame members 70 and 72 to support outer series of conveying rollers which are freely rotatably mounted between the various longitudinally extending frame members as best appreciated from FIG. 3. In addition to the outer series of conveying rollers 86, a central series of conveying rollers 88 is supported between inner longitudinally extending frame members 90 and 92 which are welded to the upper surfaces of the transversely extending frame members 74 through 80 respectively. All of the longitudinally extending frame members 70, 72, 82, 84, 90 and 92 extend from the receiving (left-hand end in FIGS. 3 and 4) to frame member 80 and terminate at frame member 80.

The reciprocating frame is extended beyond the right-hand end of the last mentioned longitudinal frame members by longitudinally extending channel shaped frame extensions 94 and 96 which longitudinally overlap the right-hand (FIGS. 3 and 4) ends of the respective frame members 70 and 72 and are welded along the longitudinal overlap in such a manner that the upper surface of extensions 94 and 96 form a continuation of the lower surfaces of members 70 and 72. At the extreme right-hand end of extensions 94 and 96, a transversely extending pivot shaft 98 is rotatably supported between extensions 94 and 96 for rotation about an axis extending transversely across the discharge end of the conveyer. Six longitudinally extending channel frame members 100, 102, 104, 106, 108 and 110, are welded to the upper surface of axle 98 and extend rearwardly from the axle in alignment with longitudinal frame members 70, 82, 90, 92, 84 and 72. Conveying rollers 112 are rotatably supported between the various frame members 100 through 110.

Frame members 100 through 110 are rigidly interconnected by transversely extending cross-frame members 114 and 116. As best appreciated by a comparison of FIGS. 5 and 6, the frame portion which includes longitudinal members 100 through 110, 114 and 116 may be tilted upwardly about the pivotal axis of axle 98, as shown in FIG. 5 or may be disposed in a normal position in which the rollers 112 mounted upon the tilting frame define a continuation of the conveying surface of the left-hand portion of the conveyers shown in FIGS. 3 and 4.

To drive the tilting frame between the positions shown in FIGS. 5 and 6, a transversely extending channel member 118 is welded between side frame extensions 94 and 96. A pair of rearwardly projecting lugs 120 are welded to frame member 118 to pivotally support an air motor 122 whose piston rod 124 is pivotally coupled at 126 to a crank 128. Crank 128 is welded to a shaft 130 which is rotatably supported between downwardly projecting frame members 132 which are fixedly secured to each of frame extensions 94 and 96. As best seen in FIG. 7, crank 128 is connected to shaft 130 approximately midway the ends of the shaft; adjacent each end of the shaft, like crank assemblies 134 and 136 are welded to shaft 130 and are pivotally connected at their outer ends to links 138 and 140 respectively. Each of links 138 and 140 is pivotally connected at its upper end to lug assemblies 142 and 144 welded to frame member 114.

To control movement of loaded pallets from the storage conveyer, a stop assembly is located at the discharge end of the conveyer. Referring first to FIG. 3, the stop assembly includes a pair of parallel longitudinally extending angle members 146 which are connected to each other by a cross-piece 148 welded to each of members 146 at the rearward end of the members. As best seen in FIGS. 5 and 6, each of the members 146 is pivotally supported upon cross-piece 118 by means of lug assemblies 150 including pivot pins 152 passing through the respective members 146. At the forward ends of each of members 146, upwardly projecting teeth such as 153, 154 are fixedly secured. As best appreciated from FIG. 6 teeth 153 and 154 may, in one position of stop assembly, project above the conveying surface of conveyer 42 to stop pallets at the discharge end of the conveyer.

As best seen in FIGS. 5 and 6, the location of the pivotal axes established by pins 152 is such that the stop assembly is unbalanced about the pivotal axis in a counterclockwise direction as viewed in FIGS. 5 and 6. A pair of projecting plates 156 welded to cross-frame member 114 project forwardly from member 114 to underlie cross-frame member 148 of the stop assembly. When the stop assembly is in the position shown in FIG. 6, cross-member 148 rests upon plates 156 and is gravitationally maintained in that position. This permits teeth 153 and 154 to project upwardly above the conveying surface of conveyer 42 to form stops. When the tilting section is elevated to the position shown in FIG. 5, plates 156 lift the left-hand end of the stop assembly upwardly and pivot the assembly about the axis defined by pins 152 so that teeth 153 and 154 are pivoted downwardly below the conveying surface.

To reciprocate the reciprocating frame upon the base frame, an air motor 158 is coupled to cross-frame member 68, which is part of the fixed or base frame, by a lug assembly 160. The piston rod 162 of motor 158 is pivotally connected to a frame member 164 which is fixedly secured to the reciprocating frame. Motor 158 is connected to a source of air under pressure by means to be described below in a manner such that piston rod 162 may be cyclically reciprocated within motor 158. The reciprocating action is controlled by means of a pair of limit switches, LS20 and LS21, mounted upon a plate secured to fixed frame member 60 and located to be alternately actuated by a striker 166 bolted to the lower surface of frame extension 96. The control connections are such that as piston rod 162 is driven to its fully extended position, striker 166 contacts the striker of limit switch LS20 which electrically reverses the pneumatic supply to motor 158 to cause the piston rod 162 to be retracted within the motor. The reciprocating frame then is driven in the reverse direction until striker 166 contacts the striker limit switch LS21 whereupon the direction of movement of piston rod 162 is reversed.

The reciprocating frame portion of conveyer 42 is normally driven in reciprocating movement. As best seen in FIG. 4, the conveying surface defined by the various rollers on the reciprocating frame slopes downwardly toward the discharge end of conveyer 42. The slope is selected to be such that a loaded pallet, if placed upon conveyer 42 with the reciprocating frame held stationary, would remain stationary. The slope is selected to be such that if the inertia of the loaded pallet is overcome and the pallet is once set in motion on the conveyer, it will continue to move until stopped. Once stopped, the slope is insufficient to cause the loaded pallet to move on the conveyer unless acted upon by some outside force. The outside force is supplied by the reciprocating movement imparted from motor 158. The net result is that while motor 158 is reciprocating, the pallets are urged toward the discharge end of conveyer 42 with a force only barely sufficient to keep them in motion and which exerts only a very little force when the pallets are held against movement by the stop assembly. Thus, assuming a single loaded pallet to be supported upon the conveyer and engaging the stop assembly, a second loaded pallet placed upon the receiving (left-hand in FIGS. 3 and 4) end of conveyer 42 would be slowly conveyed along the upper surface of conveyer 42 until it came into abutment with the pallet engaging the stop. Since the conveying force is extremely small, the force with which the second loaded pallet collides with the first is very small.

Operation of the stop assembly to discharge a single loaded pallet at a time is controlled by the pallet lift and will be described in greater detail below. It should be noted that the tilting frame assembly is mounted upon and reciprocated with the reciprocating frame assembly.

Infeed and discharge conveyer sections

Infeed section 36 and discharge section 38 may best be termed as a single conveyer since they are simultaneously driven in the same direction from a common drive assembly which includes motor and reducer assembly 40. A conveyer assembly of substantially similar construction is employed in the pallet loading machine disclosed in my copending application Serial No. 728,243, now Patent No. 3,137,286 and hence this portion of the device will be described in general terms with the understanding that details are more fully disclosed in my copending application identified above.

As is implied from FIG. 3, in which the left-hand end of infeed section 36 appears at the extreme right-hand end of FIG. 3, both conveyer sections 36 and 38 include a pair of transversely spaced power driven chains which are aligned with the outermost roller sections of conveyer 42. Midway between the idler sprockets of the chains of conveyer section 36, a central roller section is located in longitudinal alignment with the central roller section of conveyer 42.

At the receiving end of the centrally extending roller section on infeed conveyer 36, a floating roller assembly 170 is located in position to be engaged by a pallet located against stop teeth 154 on conveyer 42 when the reciprocating frame is near the forward limit of a stroke. A floating roller 172 (FIG. 7A) is supported between a pair of bell cranks such as 174 which are pivotally supported for rotation about the axis of an adjacent roller 176 supported between longitudinal frame members 178 and 180 which are part of the fixed frame of conveyer 36. Bell cranks 174 are connected at their lower ends by a strap 175 and are gravitationally biased about the pivotal axis of roller 176 by counterweight 179 in such a manner that roller 172 normally projects above the conveyer surface. When engaged by a pallet, roller 172 is depressed and bell cranks 174 are rotated about the axis of roller 176 to cause strap 175 to actuate the strikers of two limit switches LS22 and LS25 mounted upon the frame of conveyer 36.

To locate loaded pallets in position above the surface of lift platform 34, a pallet stop assembly 182 is supported upon the frame of discharge conveyer section 38. Stop assembly 182 (FIG. 8) includes a transversely extending shaft 184 rotatably supported in the machine frame and having a pair of outer stop arms 186 fixedly mounted upon the shaft for rotation with the shaft closely adjacent each of the chains of conveyer section 38. A crank 188 is secured to shaft 184 on the inside of one of the longitudinal frame members of conveyer 38 and is coupled to the piston rod 190 of an air motor 192 mounted upon the machine frame. A limit switch LS9 is mounted upon the conveyer frame in a position to be actuated by a striker 194 which is fixed to a central stop arm 186C which projects somewhat forwardly of outer stop arms 186 (see FIG. 8) and is mounted for a limited amount of lost motion rotation on shaft 184. In FIG. 8, shaft 184 is shown in one extreme limit of movement to which it is driven by motor 192. In this position, limit switch LS9 is not actuated by striker 194. The lost motion connection between shaft 184 and stop 186C permits stop 186C to be rotated slightly in a clockwise direction from the position shown in FIG. 8, the lost motion connection completing the actuation of limit switch LS9 as the loaded pallet engages outer stops 186. A substantially similar pallet stop mechanism is described in greater detail in my copending application Serial No. 728,243.

At the discharge end of conveyer section 38, a floating roller assembly 195 is mounted to actuate a limit switch LS7 when a discharged empty pallet depresses the roller. Roller assembly 195 is similar to the roller assembly shown in FIG 7A and will not be described in detail. To prevent inadvertent movement of a loaded pallet past stops 186, a plate 197 is hingedly mounted on the lift shaft frame at the exit side of the shaft. The lower edge of plate 197 is spaced above the chains of conveyer 38 to clear an empty pallet but to engage a carton supported on a pallet leaving the shaft. Engagement of plate 197 actuates a limit switch LS20, mounted on frame 30 to shut off the machine.

Pallet lift

The pallet lift employed in the machine of this application is substantially the same as the pallet lift disclosed in my copending application Serial No. 728,243. The lift includes a lift platform designated generally 34 which, as best seen in FIG. 2, presents a generally H-shaped configuration when viewed from above. The slight separation between conveyer sections 38 and 36 is for the purpose of allowing the cross-frame member of the lift platform to pass below the conveying surface of sections 36 and 38 when the lift is in its lowermost position.

Lift platform 34 is mounted for vertical movement within a lift shaft defined by frame 30. Platform 34 is raised and lowered within the lift shaft by chains such as 196 (FIG. 8) which are driven from a reversible motor drive assembly schematically shown at 198 in FIG. 2. Along one side of the lift shaft a vertically extending duct 200 forms a portion of frame 30 and serves as a mounting member for limit switches LS10, LS11, LS12, LS13 and LS14, each of the last mentioned limit switches having strikers projecting into the lift shaft to be engaged by lift platform 34 to detect the location of lift platform 34 at selected elevations within the lift shaft. The various limit switches are connected in the control system in a manner to be described in greater detail below.

Since the pallet lift disclosed in this application is substantially similar to that disclosed and described in detail in my copending application Serial No. 728,243, further description of the lift construction will be omitted.

Article position mechanism

As stated in the description of the general organization of the machine, an apron assembly 44 is mounted for reciprocating movement across the top of the shaft within which lift platform 34 is raised and lowered. In order to assist the apron in removing articles stacked upon lift platform 34, article positioning mechanism is located at the top of the lift shaft and includes an article alignment assembly 202, a stationary back up roller 204 and a reciprocating and tilting back guard mechanism 206, each of which extends transversely across the rear side of the pallet lift shaft. Upwardly and inwardly inclined alignment plates such as 207F and 207R are respectively mounted on the front and rear sides of the pallet lift shaft to guide misaligned cartons or articles to positions where they will clear alignment assembly 202 and apron 44 in their retracted position. This structure is best shown in FIGS. 10 through 15 inclusive.

Proceeding upwardly through the lift shaft, alignment assembly 202 is the first of the three positioning mechanisms to be encountered. Assembly 202 includes a transversely extending pusher plate 208 which is supported upon a pair of crank arms 210, each crank arm being supported for pivotal movement about a vertical axis from frame members 212 fixedly mounted upon frame 30 and pivotally coupled to plate 208 at their outer ends for movement about vertical pivotal axes. As best shown in FIG. 11, pusher plate 208 is thus supported for movement into and out of the lift shaft between the retracted position shown in full line in FIG. 11 and the extended position shown in broken line in FIG. 11. Pusher plate 208 is driven in movement between the respective positions shown in FIG. 11 by an air motor 214 mounted upon frame 30 and coupled through a suitable linkage 216 to a crank 218 fixed to one of the cranks 210. A limit switch LS26 is mounted upon the machine frame at a location where its striker is actuated when pusher plate 208 is in its retracted position.

The primary function of assembly 202 is to align the rear side of a layer of articles in front of stationary back up member 204 which, as best seen in FIGS. 13 and 14 takes the form of a roller 220 mounted on clips 221 fixed to and extending between a pair of fixed frame members 222 for rotation about a horizontal axis extending transversely across the rear side of the lift shaft. As best seen in FIG. 14, pusher plate 208, when in its fully extended position projects outwardly into the lift shaft beyond roller 220.

Stationary back up roller 220 is located to slightly below apron 44, the relationship between roller 220 and the leading edge of apron 44 when the apron is in the fully extended position being best shown in FIGS. 14 and 15. Roller 220 forms a stationary back stop to prevent movement of the uppermost layer of articles away from the leading edge of apron 44 as the apron is driven from right to left in FIG. 12A.

The reciprocating and tilting back guard 206 includes a pusher plate 224 having rearwardly projecting support plates 226 rigidly secured to plate 224 near each end. Near the lower end of each support plate 226, a pivot pin 228 pivotally connects each plate 226 to a triangular frame plate 230. Each of triangular plates 230 is supported for horizontal movement within a fixed track 232 mounted upon frame sections 222 of the machine frame by a pair of rollers such as 234 rotatably mounted upon each plate 230. An arcuate slot 236 is cut into each support plate 226 to receive the shank of a pin 238 mounted upon the associated triangular plate 230 to guide support plates 226 and hence pusher plate 224 in pivotal movement about the axis established by the pins 228 at each end of plate 224.

An air motor 240 (FIGS. 9 and 12A) is mounted upon the machine frame and has its piston rod 242 pivotally connected to a central plate 244 mounted upon pusher plate 224. Actuation of air motor 240 serves to drive pusher plate 224 between the retracted position shown in FIG. 12A and the extended position shown in FIGS. 14 and 15. To reduce twisting or bending of plate 224, a pair of spaced links 246 (FIG. 15) are pivotally coupled to plate 224 at transversely spaced locations and are pivotally connected by their other ends to cranks 248 rigidly secured to a transversely extending shaft 250 pivotally mounted in the conveyer frame.

The direct connection between plate 224 and piston 242 of motor 240 combined with the engagement between the rearward-most roller on each of plates 230 and the conveyer frame, causes the plate 224 to be inclined upwardly and rearwardly above stationary roller 220 when plate 224 is in the fully retracted position shown in FIG. 12A. When piston rod 242 is extended to drive plate 224 to the position shown in FIGS. 14 and 15, engagement of the lower surface of plate 224 with an article causes the plate to pivot about the axis defined by pins 228 into a vertical plane as shown in FIGS. 14 and 15. The purpose of the reciprocating and tilting back guard assembly 206 is to drive the layer of articles supported by apron 44 when in its fully extended position rearwardly of the apron to locate the layer of articles rearwardly of the loading edge of the apron. The tilted position assumed by plate 224 when in its retracted position prevents interference between the plate and the rearwardmost articles of a layer as the rearwardmost articles are moved up onto the surface of the apron.

*Lift control assembly*

The lift control assembly 50 is mounted (FIGS. 9 and 10) on the machine frame and includes a frame 250 which projects upwardly above elevated frame members 46 to rotatably support a shaft 252. A carton engaging plate 254 is supported in a position overlying the lift shaft by an arm 256 which is coupled to shaft 252 by means of a hub 258 for a limited amount of rotation relative to the shaft. A crank 260 is coupled to shaft 252 and is connected at its radially outermost end to the piston rod 262 of an air motor 264 fixedly secured to the machine frame. Air motor 264 acts to move arm 256 between a lowered position where the arm is inclined downwardly from shaft 252 as shown in FIG. 10 and an elevated position in which plate 254 is supported clear above articles supported on apron 44. As articles are elevated within the lift shaft with arm 256 in its lowered position, the upper surface of the articles engages plate 254 which begins to rotate arm 256 upwardly about the axis of shaft 252. The slight amount of upward rotation imparted to arm 256 is the limited relative rotation permitted by the coupling of the hub 258 and causes a lug 266 rotatable with the shaft 252 to actuate the striker of a limit switch LS18 mounted upon frame 250 which, through a suitable control circuit actuates the air motor 264 to retract piston rod 262. Retraction of piston rod 262 takes up the remaining rotative lost motion between shaft 252 and hub 258 and elevates arm 256 and hence plate 254 upwardly clear of the articles within the lift to permit the articles to be engaged by the apron and transferred without interference from plate 254. A second limit switch LS19 is mounted upon frame 250 in a position where its striker may be engaged by a suitably located lug 268 mounted upon hub 258. Limit switches LS18 and LS19 are connected into the machine control circuit in a manner to be described in more detail below.

*Apron assembly*

Apron 44 includes a pair of spaced parallel side frame members 272 and 274 which are interconnected by an open grid-like rigid framework designated generally 276. The article supporting surface of the apron takes the form of a plate 278 fixed to the framework defined by members 272 through 276. As best seen in FIG. 9, the article supporting surface of plate 278 is slightly larger than the area of lift shaft 32 and hence, when the apron is in its fully extended position as shown in FIG. 9, the apron fully overlies the upper end of the lift shaft.

Apron 44 is supported from the conveyer frame by means of a plurality of rollers such as 280 which are rotatably mounted upon the respective side frame members 272 and 274 and project outwardly from the respective members to be received within fixed tracks 282 and 284 which respectively extend along the interior surface of the oppositely located elevated frame members 46 for substantially the entire length of the members. Apron 44 is driven in movement from a reversible drive motor assembly 286 mounted on frame 30 and coupled through a reducing unit 288 to drive a transversely extending shaft 290 rotatably supported from the fixed machine frame. Downwardly facing rack assemblies 292 and 294 are fixedly secured to the lower sides of the respective side frame members 272 and 274 to mesh with drive pinions 296 and 298 respectively fixed to shaft 290 and rotate therewith.

As best seen in FIG. 16, one side frame member 274 carries an upstanding abutment 300 which is adapted to engage the strikers of limit switches LS16, LS17 and LS24 and LS27, mounted upon the adjacent elevated frame member 46 as best seen in FIGS. 10 and 16. Limit switches LS16 and LS17 are respectively engaged when the apron is in its fully retracted and fully extended position while LS24 detects the approach of apron 44 to its fully extended position. LS27 is actuated as the apron leaves its fully retracted position.

At the leading edge (left-hand edge in FIGS. 9 and 12A) of apron 44, a rotatable roller assembly 302 extends transversely between side frame members 272 and 274 and is journaled within the respective members for rotation about an axis extending transversely across the entire leading edge of the apron. Roller assembly 302 is driven in rotation by a motor 304 coupled to roller 302 through a suitable reducer and chain drive assembly designated generally 306. Motor 304 is driven in a direction such that roller 302 is driven in a clockwise direction of movement as viewed in FIG. 12A. This causes the forward or left-hand side of roller 302 to be continuously driven upwardly and the upper surface of the roller to be continuously driven rearwardly of the surface of apron 44.

Rotation of roller 302 in the aforementioned direction urges articles engaged by the roller, upwardly and rearwardly onto the surface of apron 44. To provide an increased frictional grip between roller 302 and the articles, roller 302 is constructed to include a hexagonal shaft 308 upon which a pair of rubber sleeves 310 are supported by a metal sleeve assembly 312. The sleeves 310 are axially compressed by means of opposed nuts 314 which are threaded onto reduced diameter cylindrical sections located at the outermost ends of shaft 308. In order to brace the central portion of shaft 308, a central bearing 316 is located upon the apron frame 276 to rotatively receive an inner bearing race 318 on shaft 308.

Apron 44 is movable between the fully retracted position shown in FIG. 2 wherein roller 302 is located above and slightly to the right of the side of the lift shaft defined by guide plate 207F (FIG. 12A). Accumulation table 48 fully underlies apron 44 when the apron is in its retracted position, extending transversely between opposed frame members 46 and longitudinally from guide plate 207F to gravity conveyer section 52. Apron 44 is shown in its fully extended position in FIGS. 14 and 15.

Referring now to FIG. 12B, at its rearward edge apron 44 is constructed with a downwardly inclined slider bed discharge section 322. As best seen in FIG. 12B, the rearwardmost (right-hand) edge 44a of apron 44 is supported for movement somewhat above the upper surface of accumulation table 48.

At the discharge (right-hand side) of accumulation table 48, gravity conveyer section 52 is located and includes a plurality of conventional conveying rollers mounted within the machine frame to define a downwardly inclined surface upon which articles may freely roll from accumulation table 48 onto the conveying surface of powered roll conveyer 54. Powered roll conveyer 54 is driven by a reversible motor 54M (shown only schematically in FIG. 22) to be controlled by the operator to transfer cartons in either direction and discharges at either end onto gravity conveyers (not shown). This enables the operator to manually separate cartons of different types—i.e., cartons containing twelve ounce bottles from cartons containing quart bottles.

*Pneumatic control system*

The pneumatic control system of the above described machine is schematically illustrated in FIG. 20. In general, the pneumatic control system is constructed from commercially available components of well-known construction, hence the description of the system will be given primarily in functional terms.

All of the various air motors are substantially identical and include, as shown in the cross-sectional view of motor 158 a cylinder defining a chamber in which a conventional piston may be reciprocated. Conduits 400 and 402 are connected into the cylinder to respectively communicate with the space between the piston and head end of the cylinder and the space between the piston and the rod end of the cylinder. Conduits 400 and 402 are connected to ports of a conventional two-position solenoid operated four-way reversing valve 406 in which aligned ports of valve 406 are connected respectively to a pressure supply line 408 and an atmospheric exhaust conduit designated EXH. Valve 406 includes a reciprocal valve piston having two sets of connections, either of which may be positioned in alignment between the ports by operation, in the case of motor 158, of either of the solenoids SO1F or SO1R. In FIG. 20 the valve piston is in the position which it would assume if solenoid SO1R were actuated, the valve connections being such as to connect pressure conduit 408 to rod end conduit 402 and to connect head end conduit 400 to exhaust conduit EXH. This set of connections supplies pressure to the right-hand side of the piston of motor 158 and vents the chamber at the left-hand side of the piston to drive the piston to a position in which its piston rod 162 is at its fully retracted position. Upon subsequent actuation of solenoid SO1F, the cross-connections of the valve piston would be placed between the respective valve ports to connect conduit 408 to head end conduit 400 and to connect rod end conduit 402 to exhaust conduit EXH. This position of the valve could cause the piston rod to stroke to the right as viewed in FIG. 20 to fully extend piston rod 162.

The remaining air motors 122, 192, 214, 240 and 264 are of substantially similar construction to motor 158, although the physical dimensions as to bore and stroke will, of course, be varied in accordance with the requirements of the particular mechanism which the motor operates. Solenoid operated reversing valves of construction substantially identical to valve 406 are connected to the various motors to operate in the fashion described above in connection with valve 406 and motor 158. The construction of all of the valves is such that the valve piston remains in the position to which it was last actuated, even upon a subsequent de-energization of the solenoid which drove it to the particular position. The valve piston changes positions only upon actuation of the solenoid connected to drive it to the opposite position. For convenience in the description of the operation, the valve associated with tilting motor 122 is indicated by reference numeral 410 and controlled by solenoids SO2U and SO2D, the subscripts U and D indicating up and down positions of the tilting frame. Pallet stop motor 192 is controlled from valve 412 which is operated by solenoids SO3U and SO3D, U and D again indicating the solenoid actuated to drive the pallet stop to its up or down position. Valve 414 controls lift control motor 264 and is controlled by solenoid SO4U and SO4D. The reciprocating and tilting back guard operating motor 240 is controlled from valve 416 which is operated by solenoids SO5R and SO5E, subscripts R and E respectively indicating the retracted and extended position of the back guard. Alignment mechanism motor 214 is controlled from valve 418, valve 418 being controlled by the respective solenoids SO6R and SO6E.

Pressure is supplied to conduit 408 and thence to the various valves from a schematically illustrated source of pressure 420.

*Electrical control circuit and operation*

The electrical control circuit of FIGS. 21 and 22 operates to actuate the various solenoids described above in connection with the pneumatic circuit and various relays employed in the operation of the reversible pallet lift drive motor 198, infeed and discharge chain drive motor 40, reversible apron drive motor 286 and roller drive motor 304. The electrical connections to the various electrical drive motors are conventional and are indicated in FIG. 22. The motor control solenoids appear in FIG. 21 and when energized close the contacts designated by the corresponding reference numeral with subscripts x, y and z in FIG. 22. The relays for energizing lift drive motor 198 to drive either in a raising or lowering direction are indicated at D1U and D1D respectively indicating the conditions to drive the lift up or down within the lift shaft. Since the infeed and discharge conveyer chain drive motor 40 drives only in one direction it is represented on the electrical circuit diagram as a single relay D2. The relays for controlling reversible apron drive motor 286 appear at D3R and D3F respectively representing energization of apron drive motor 286 in the retracting and forward stroke. Roller motor 304 drives in only a single direction and is represented by a single relay D4. Relays for controlling discharge conveyor 54 are D5R and F5L respectively representing driving of conveyer 54 in a direction to convey articles to the operator's right and left.

On the schematic diagram contacts controlled by the various limit switches are designated by the reference numeral employed to designate the actuating limit switch—for example contacts LS9a are controlled by limit switch LS9. The limit switch contacts are illustrated in either an open or closed position on the diagram, the position in which the contacts are shown on the diagram is the condition assumed when the associated limit switch striker is disengaged from its actuator.

In addition to the various limit switch contacts, relay controlled contacts are represented on the drawings either by a pair of parallel lines or by a pair of parallel lines with a diagonal line crossing the parallel lines. In each case, the relay contact is designated by a reference numeral which includes the reference numeral applied to the controlling relay followed by a subscript to identify the particular contact. Hence, the contact D1Ua is controlled by relay D1U. Where no diagonal line appears in connection with the contact, it indicates that the particular contacts are normally open—that is are open whenever the controlling relay is de-energized. Contacts illustrated with a diagonal line crossing the parallel lines are normally closed contacts which are closed whenever the associated relay is de-energized.

It is believed that a description of the electrical control system will be more clearly understood when described in connection with the operation of the machine.

As an initial condition, it will be assumed that a supply of pallets to be unloaded are located upon receiprocating gravity conveyer 42 and are maintained on the conveyer by virtue of the fact that the tilting section is in its lower position and the stop assembly is in engagement with the endmost pallet. Pallet lift platform will be assumed to be at its lowermost limit of travel wherein the upper surface of the pallet lift platform 34 is disposed slightly below the conveying surface of infeed and discharge conveyers 36 and 38 respectively. Pallet stops 186 will be raised as in FIG. 8. The lift control arm 256 will be assumed to be in its lowermost position; alignment assembly 202 and the reciprocating and tilting back guard assembly 206 will be in their fully retracted position. Apron 44 will likewise be in its fully retracted position.

To commence a cycle of operation, the machine operator depresses start button S–1 which completes a circuit across the electrical power supply lines L–1 and L–2 through normally closed contacts LS11a, LS12a, and LS29a, stop button contact S–2 and master relay M–1. Start button S–1 is of the momentary depression type, as soon as relay M–1 is energized it locks itself in through contacts M–1a which by-pass the contacts of start button S–1 to permit the start button to be released. Limit switches LS11 and LS12 are located upon duct 200 to function as safety over travel switches to prevent actuation of the machine or to shut the machine off in the event that lift platform 34 moves beyond either its upper or lower limit of travel to open the circuit to relay M–1 while LS29 functions in the event a loaded pallet passes beyond stops 286.

At this time, the reciprocating frame of gravity conveyer 42 will be reciprocated by its drive motor 158, reversal of movement taking place upon the alternate engagement of the strikers of limit switches LS21 and LS20 which alternately close normally open contacts LS21a and LS20a, alternately energizing solenoids SO1R and SO1F to maintain the motor 158 in continuous reciprocation. If a loaded pallet is in engagement with the stops on the reciprocating gravity conveyer, at the forward end of a stroke of the conveyer, the loaded pallet will engage roller 172 of the floating roller section to pivot bell cranks 174 in a direction which will actuate the striker of limit switch LS22 to close contact LS22a. Contacts LS22b are simultaneously opened to de-energize solenoid SO1R, thereby preventing retraction of the reciprocating gravity conveyer from its lowermost position, contacts LS14b will be closed, hence a circuit is completed through solenoid SO2U which actuates valve 410 to cause air motor 122 to drive in a direction fully extending piston rod 124.

The foregoing action of motor 122 tilts the tilting section upwardly about the axis defined by shaft 98 from the position shown in FIG. 6 to the position shown in FIG. 5. This action retracts stop teeth 153 and 154 and permits the endmost pallet to roll, under the action of gravity, from the tilting section onto the infeed chain conveyer 36 which at this time is energized (relay D2 energized through normally closed contacts R3a and contacts LS10b which are closed when lift is at lower limit) to convey the pallet toward the waiting lift platform.

As a safety precaution, contacts LS10b are by-passed by lock-in contacts D2a and safety contacts LS25a. Contacts LS25a are opened by depression of floating roller assembly 170 and remain open as long as assembly 170 is depressed by the entering loaded pallet. Were contacts LS25a omitted, it would be possible for relay D2 to be energized by a momentary closing of contacts LS10b and relay D2 would then be locked in by contacts D2a. In the event of an accidental momentary actuation of contacts LS10b, as by a falling carton, the subsequent opening of contacts LS10b would have no effect on relay D2. This would make it possible for the chains to drive a loaded pallet into the lift when the lift platform was not in position to receive it. Contacts LS25a eliminate this possibility by remaining open for the time required to convey the loaded pallet across assembly 170, thus making driving movement of the infeed conveyer chains dependent upon contacts LS10b which are closed only when the lift is in position to receive the pallet.

As the loaded pallet passes from the tilting section onto the infeed conveyer, floating roller 172 remains depressed, hence contacts LS22b remain open to open the circuit to solenoid SO1R to prevent the reciprocating frame from being withdrawn from its forwardmost position during the transfer of the loaded pallet from conveyer 42 to infeed conveyer 46.

Because apron 44 is in its fully retracted position, relay R–1 and parallel connected relay TDR1 are both energized at this time, since normally opened contacts LS16a are closed by virtue of the fact that the striker of limit switch LS16 is engaged by the apron. Since contacts R1a are closed the circuit through lift motor control relay D1U is in condition to be energized upon the closing of contacts LS9a. Contacts LS9a closed upon the slight rotative movement of center stop arm 186C when the arm 186C is engaged by the entering loaded pallet. Thus, as the loaded pallet arrives in the position over lift platform 34, contacts LS9a are closed and a circuit is completed through contacts R1a, normally closed contacts LS18a, LS13a, normally open contacts LS26a (closed now by the presence of pusher plate 208 in its retracted position) and contacts D1Da to energize relay D1U. When relay D1U is energized, it actuates lift drive motor 198 to drive chains 196 in a direction elevating lift platform 34 and hence the loaded pallet. As soon as relay D1U is energized, contacts D1Ua are also closed to by-pass contacts LS9a and R1a to lock in relay D1U.

Lift motor 198 continues to elevate the loaded pallet within the lift shaft until the uppermost layer of cartons comes in contact with plate 254 of lift control assembly 50. Upon a slight upward movement of plate 254, shaft 252 is rotated a distance sufficient to open normally closed contacts LS18a, thus de-energizing relay D1U and stopping raising of the lift. Actuation of the striker of limit switch LS18 simultaneously closes contacts LS18b to energize apron drive motor control relay D3F through normally closed contacts LS17a, time delay relay contacts TDR1a and normally closed contacts D3Ra. Contacts TDR1a are closed since their controlling time delay relay TDR1 has been energized since the start of the cycle. Contacts TDR1a are set to remain open for a predetermined interval after their controlling relay is energized for purposes which will be described below. Relay D3F is locked in through contacts D3Fa which by-pass contacts TDR1a. Roller drive motor control relay D4 is connected in parallel with relay D3F through normally open contacts LS27a to be energized as apron 44 moves away from its retracted position by the closure of contacts LS27a. Lock-in contacts D4a by-pass contacts LS27a to continuously rotate pick up roller 302 as the apron moves across the lift shaft.

Energization of relay D3F closes contacts D3Fc to complete a circuit across the supply lines through contacts R1b, closed because relay R1 is energized, and lift control arm operating solenoid SO4U, which actuates air motor 264 in a direction causing its piston rod 262 to retract, thereby elevating plate 254 clear of the uppermost layer of articles supported within the lift shaft.

Solenoid SO6F is connected in parallel with solenoid SO4U and is simultaneously energized to actuate air motor 214 to drive pusher plate 208 outwardly from its retracted position to compact the next to uppermost layer of articles on the pallet.

Relay D3F energizes apron drive motor 286 to drive the apron from its fully retracted position outwardly across the lift shaft. At this time, the uppermost layer of articles supported upon lift platform 34 has been located, by the operation of lift control mechanism 50, in such a position that the uppermost layer of articles is positioned within the path transversed by apron 44 during movement toward its fully extended position. The initial stage of movement of the apron is shown in FIG. 12A.

As the apron advances toward the left as viewed in FIG. 12A, cartons are engaged by the left-hand portion of the apron. The clockwise rotation imparted to roller 302 frictionally engages the surface of the carton to urge the carton upwardly and then rearwardly onto the upper surface of apron 44. Effectively, apron 44 is passed through the stack of articles supported on lift platform 34 beneath the uppermost layer of articles supported upon the lift. Back-up roller 220 engages the opposite side of the layer of articles to prevent movement of the articles away from the apron as it is driven toward its extended position.

As apron 44 approaches its fully extended position, limited switch LS24 is actuated by the apron and acts to close contacts LS24a. Contacts LS24a complete a circuit across the supply line through solenoid SO5E which actuates valve 416 to cause motor 240 to drive the reciprocating and tilting back guard assembly 206 from the position shown in FIG. 12A outwardly over the upper surface of the apron to the position shown in FIGS. 14 and 15. This action drives the layer of articles rearwardly of the apron away from the leading edge. When the apron reaches its fully extended position, the striker of limit switch LS17 is engaged to open contacts LS17a, thereby de-energizing relays D3F and D4 and stopping further forward movement of the apron, and rotation of the pick up roller.

Concurrently with the opening of contacts LS17a, contacts LS17b are closed in preparation to energize relay R2 through contacts LS16b which closed as the apron moved away from its retracted position. Energization of relay R2 may be delayed until normally open contacts LS28a are closed by the arrival of back guard assembly 206 at its fully extended position. By-pass contacts R2b are energized to lock in relay R2 upon energization. Contacts R2a are closed by the energization of relay R2 to energize apron drive motor control relay D3R through the normally closed contacts D3Fb to actuate apron drive motor 286 to drive in the reverse direction to return apron 44 to its retracted position.

Foot switch contacts FS may be actuated by the operator to stop or start apron 44 during its retracting movement. To return apron 44 to its retracted position from any point in its forward stroke, push button PB1 may be manually actuated to open the D3F energizing circuit and energize D3R to return the apron to its retracted position. Contacts D3Rb by-pass limit switch contacts LS24a to energize solenoid SO5E to drive back guard assembly 206 to its extended position each time the apron moves in a retracting direction, thereby assuring operation of back guard 206 if the apron is retracted from a point short of its fully extended position.

When the apron reaches its fully retracted position with the layer of articles supported upon its upper surface, contacts LS16a are again closed, closing contacts R1b to energize solenoid SO4D through contacts LS19a which are closed because the lift control arm 256 is in its uppermost position. Solenoid SO4D operates valve 414 to cause motor 264 to lower arm 256. Parallel connected relay SO6R is simultaneously energized to retract pusher plate 208. Contacts R1a are closed and when pusher plate 208 reaches its retracted position, contacts LS26a are closed to again energize lift drive motor control relay D1U to drive lift motor 198 to raise the lift. The uppermost layer of articles supported upon the lift soon engage plate 254 of lift control mechanism 50 to stop further raising of the lift as in the previously described cycle. The lift control arm 256 is again elevated as in the previous case.

Forward movement of apron 44 is delayed in accordance with the time delay characteristics of relay TDR1. Relay TDR1 is energized immediately upon the closing of contacts LS16a by the arrival of apron 44 at its fully retracted position. However contacts TDR1a do not close immediately but remain open for a predetermined time interval while a second set of contacts TDR1b controlled by the time relay remain closed for the corresponding period. When both contacts R1b and TDR1b are closed, solenoid SO5R is energized to actuate valve 416 to cause back guard motor 240 to return the reciprocating and tilting back guard to its retracted position.

When contacts TDR1a finally close, a circuit is again completed through relay D3F to drive the apron toward its fully extended position. Closing of contacts D3Fc upon this energization complete a circuit through solenoid SO6R which actuates valve 418 to cause the alignment mechanism motor 214 to stroke outwardly into the lift shaft to align the next lowermost layer of articles vertically with the surface of stationary back-up roller 220.

As the apron strokes toward its fully extended position, the layer of articles now uppermost upon the lift is transferred to the upper surface of the apron in the same fashioned as the previously described layer. As the second layer is transferred from the lift platform 34 to the apron surface, it engages the previously transferred layer of articles and prevents them from moving to the left with the apron. Thus, as the apron moves beneath the layer of articles supported within the lift shaft, it moves out from underneath the previously transferred layer of articles which thus drops onto the surface of accumulation table 48 as the apron moves to its fully extended position.

As the apron approaches its fully extended position, the striker of limit switch LS24 is again engaged to close contacts LS24a and to reciprocate the reciprocating and tilting back guard 206 outwardly over the upper surface of the apron. This action drives the last transferred layer of articles to the right (FIG. 12A) upon the surface of the apron to a location on the apron beyond roller 302.

As the apron arrives in its fully extended position, limit switch LS17 is again actuated, to reverse the apron drive motor. As the apron is driven back toward its retracted position, the right-hand edge (FIG. 12B) of the apron engages the layer of articles supported upon the surface of accumulation table 48 and drives them to the right onto gravity conveyer section 52. The layer of articles rolls down inclined section 52 onto the surface of powered roller conveyer 54. The machine operator is located to manually guide and align the articles on conveyer 54 as they flow down the gravity conveyer section 52.

The operator manually aligns the cartons on conveyer 54. The direction in which articles are conveyed is controlled by push buttons PBR and PBL. Momentary pression of push button PBR energizes relay D5R which causes motor 54M to drive conveyer 54 in a direction conveying cartons to the operator's right. Lock-in contacts D5Rb by-pass push button contacts PBR to maintain relay D5R energized upon release of the push button. A similar circuit is connected to relay D5L which energizes conveyer motor 54M to drive in the opposite direction. Conveyer 54 may be stopped by depressing stop button S3, thus opening the circuit to both relays D5R and D5L.

The foregoing cycles are continuously repeated until, upon the removal of the last layer of articles from the lift, further upward movement of the lift actuates limit switch LS13, indicating the arrival of the lift at its uppermost limit of movement. When the striker of limit switch LS13 is actuated, it closes contacts LS13b to complete a circuit through lift motor control relay D1D through normally closed contacts LS7a and LS10a and D1Ub. When relay D1D is energized it locks itself in by-passing contacts LS13b through contacts D1Db. Relay D1D actuates the lift drive motor 198 to lower lift platform 34, with the empty pallet.

Lift platform 34 is lowered until it arrives at its lowermost limit of movement, at which time the striker of limit switch LS10 is engaged to open contacts LS10a in the circuit to relay D1D.

Actuation of relay D1D, while energized, closes contacts D1Dc to energize relay R3, closing contacts R3b and R3c which respectively actuate solenoid SO3D to retract pallet stop arm 186 by suitable operation of motor 192 and solenoid SO6R to retract pusher plate 208.

When the lift arrives at its lowermost position, relay D1D is de-energized, opening contact D1Dc and thereby de-energizing relay R3. This action closes contacts R3a and energizes relay D2 through contacts LS10b which are closed upon the arrival of the lift at its lowermost limit. Relay D2 energizes the chains of infeed and discharge conveyer sections 36 and 38 to drive the empty pallet to the right (FIG. 8) away from the lift over the lowered stop arm 186. When the empty pallet reaches floating roller assembly 195, the roller assembly is depressed to actuate limit switch LS7 to close contacts LS7b, thereby energizing solenoid SO3U which actuates motor 192 to drive the pallet stop arm 186 upwardly to be in a position to engage the loaded pallet as it arrives above lift platform 34.

At the arrival of lift platform 34 at its lowermost position, the striker of limit switch LS14 is again engaged to close contacts LS14b. As the reciprocating conveyer 42 continuously reciprocates, the loaded pallet in engagement with stop 154 will, upon one of its forward strokes, engage floating roller 172 to depress the roller and thus actuate limit switch LS22 to close contacts LS22a. As in the previous case closing of contacts LS22a actuates solenoid SO2U to raise the tilt section and another cycle of operation is initiated.

While I have described but one embodiment of my invention, it will be apparent to those skilled in the art that the disclosed embodiment may be modified. Therefore, the foregoing description is to be considered exemplary rather than limiting and the true scope of the invention is that defined in the following claims.

I claim:

1. Apparatus for unstacking articles stacked in layers comprising a frame, lift means for raising and lowering a stack of articles within a lift shaft defined by said frame, an apron mounted on said frame for movement along a path extending between a retracted position at one side of said lift shaft and an extended position overlying said lift shaft, means operable when said apron is in said retracted position for locating said lift means within said shaft to position the uppermost layer of a stack of articles supported upon said lift means in the path of said apron, reversible drive means operable when said uppermost layer is located in the last mentioned position for driving said apron to said extended position by passing said apron through said stack beneath said uppermost layer of articles, and means responsive to the arrival of said apron at said extended position for reversing said drive means to drive said apron to said retracted position with said uppermost layer of articles supported thereon.

2. Apparatus for unstacking articles stacked in layers comprising a frame, lift means for raising and lowering a stack of articles within a lift shaft defined by said frame, an apron mounted on said frame for movement along a path extending between a retracted position at one side of said lift shaft and an extended position overlying said lift shaft, said apron having a leading edge extending across said one side of said shaft when said apron is in said retracted position, means operable when said apron is in said retracted position for locating said lift means within said shaft to position the uppermost layer of a stack of articles supported upon said lift means in the path of said apron, reversible drive means operable when said uppermost layer of articles is located in the last mentioned position for driving said apron to said extended position, means extending across said leading edge of said apron for urging articles engaged by said apron during movement toward said extended position upwardly and rearwardly onto the upper surface of said apron, and means responsive to the arrival of said apron at said extended position for reversing said drive means to drive said apron to said retracted position with said uppermost layer of articles supported thereon.

3. Apparatus for unstacking articles stacked in layers comprising a frame, lift means for raising and lowering a stack of articles within a lift shaft defined by said frame, an apron mounted on said frame for movement along a path extending between a retracted position at one side of said lift shaft and an extended position overlying said lift shaft, said apron having a leading edge extending across said one side of said shaft when said apron is in said retracted position, roller means on said leading edge of said apron mounted for rotation about an axis extending across said leading edge, means operable when said apron is in said retracted position for locating said lift means within said shaft to position the uppermost layer of a stack of articles supported upon said lift means in the path of said apron, reversible drive means operable when said uppermost layer is located in the last mentioned position for driving said apron to said extended position, means on said apron for rotating said roller means about said axis in a direction to urge articles engaged by said roller means during movement of said apron towards said extended position upwardly and rearwardly onto the upper surface of said apron, and means responsive to the arrival of said apron at said extended position for reversing said drive means to drive said apron to said retracted position with said uppermost layer of articles supported thereon.

4. Apparatus for unstacking articles stacked in layers comprising a frame, lift means for raising and lowering a stack of articles within a lift shaft defined by said frame, an apron mounted on said frame for movement along a path extending between a retracted position at one side of said lift shaft and an extended position overlying said lift shaft, said apron having a leading edge extending across said one side of said shaft when said apron is in said retracted position, means operable when said apron is in said retracted position for locating said lift means within said shaft to position the uppermost layer of a stack of articles supported upon said lift means in the path of said apron, reversible drive means operable when said uppermost layer of articles is located in the last mentioned position for driving said apron to said extended position by passing said apron beneath said uppermost layer of articles, back-up means mounted on said frame and extending across the side of said lift shaft opposite said one side to engage said uppermost layer of articles to prevent movement of articles in said uppermost layer away from said apron during movement of said apron toward said extended position, first means responsive to the approach of said apron to said extended position for driving said back-up means to a position overlying said apron to drive said uppermost layer of articles rearwardly of said apron, and second means responsive to the arrival of said apron at said extended position for reversing said drive means to drive said apron to said retracted position with said uppermost layer of articles supported thereon.

5. Apparatus for unstacking articles stacked in layers comprising a frame, lift means for raising and lowering a stack of articles within a lift shaft defined by said frame, an apron mounted on said frame for movement along a path extending between a retracted position at one side of said lift shaft and an extended position overlying said lift shaft, said apron having a front edge extending across said one side of said shaft when said apron is in said retracted position, means operable when said apron is in said retracted position for locating said lift means within said lift shaft to position the uppermost layer of a stack of articles supported upon said lift means in the path of said apron, reversible drive means operable when said uppermost layer of articles is located in said last mentioned position for driving said apron to said extended position, back-up means mounted on said frame and extending across the side of said shaft opposite said one side to engage said uppermost layer of articles to prevent movement of articles in said uppermost layer away from said apron as said apron is driven towards said extended position, means extending across said front edge of said apron for urging articles engaged by said front edge of said apron during movement toward said extended position upwardly and rearwardly onto the upper surface of said apron, means responsive to the approach of said apron to said extended position for reciprocating said back-up means above the upper surface of said apron to drive said uppermost layer of articles rearwardly of said apron, and means responsive to the arrival of said apron at said extended position for reversing said drive means to drive said apron to said retracted position with said uppermost layer of articles supported thereon.

6. Apparatus as defined in claim 5 wherein said means extending across said front edge of said apron comprises roller means mounted for rotation about an axis extending across said front edge of said apron, and means on said apron for driving said roller means in rotation about said axis in a direction in which the uppermost surface of said roller means is driven rearwardly of said apron.

7. Apparatus for unstacking articles stacked in layers comprising a frame, lift means for raising and lowering a stack of articles within a lift shaft defined by said frame, an accumulation table mounted on said frame adjacent one side of said lift shaft, an apron mounted on said frame for movement along a path extending between a retracted position wherein said apron overlies said accumulation table and an extended position wherein said apron overlies said lift shaft, means operable when said apron is in said retracted position for locating said lift means within said shaft to position the uppermost layer of a stack of articles supported upon said lift means in the path of said apron, reversible drive means operable when said uppermost layer of articles is located in the last mentioned position for driving said apron to said extended position by passing said apron beneath said uppermost layer of articles, the upper surface of said apron having an article supporting area substantially equal to the area required to support said uppermost layer of articles whereby any articles supported upon said apron prior to the initial movement of said apron from said retracted position are driven by said uppermost layer of articles from said apron to said accumulation table during movement of said apron toward said extended position, means responsive to the arrival of said apron at said extended position for reversing said drive means to drive said apron to said retracted position with said uppermost layer of articles supported thereon, and means on said apron engageable with articles supported upon said accumulation table to drive said articles from said accumulation table during movement of said apron toward said retracted position.

8. Apparatus for unstacking articles stacked in layers comprising a frame, lift means for positioning a stack of articles within a lift shaft defined by said frame with the uppermost layer of articles in the stack located at a selected elevation, apron means mounted upon said frame and operable upon the location of said uppermost layer of articles at said selected elevation to move from a retracted position clear of the front side of said lift shaft rearwardly across said shaft to an extended position by passing beneath said uppermost layer of articles, a stationary back-up member mounted upon said frame and extending across the rear side of said shaft to engage the rear side of said uppermost layer of articles to prevent movement of said uppermost layer of articles away from said apron means during movement of said apron means toward said extended position, and alignment means mounted upon said frame and extending across said rear side of said shaft below said stationary back-up member operable upon rearward movement of said apron means to drive the rear side of the layer of articles immediately below said uppermost layer of articles to a location forwardly of said stationary back-up member.

9. Article handling apparatus as defined in claim 8 including means on said apron operable during movement of said apron toward said extended position to urge articles upwardly from said uppermost layer onto said apron.

10. Apparatus for unstacking articles stacked in layers comprising a frame, lift means for positioning a stack of articles within a lift shaft defined by said frame with the uppermost layer of articles in the stack located at a selected elevation, apron means mounted upon said frame and operable upon the location of said uppermost layer of articles at said selected elevation to move from a retracted position clear of the front side of said lift shaft rearwardly across said shaft to an extended position by passing beneath said uppermost layer of articles, a stationary back-up member mounted upon said frame and extending across the rear side of said shaft to engage the rear side of said uppermost layer of articles to prevent movement of said uppermost layer of articles away from said apron means during movement of said apron means toward said extended position, and movable back-up means mounted upon said rear side of said shaft above said stationary back-up member for driving articles supported upon said apron when in said extended position away from said rear side of said shaft.

11. Apparatus for unstacking articles stacked in layers comprising a frame, lift means for positioning a stack of articles within a lift shaft defined by said frame with the uppermost layer of articles in the stack located at a selected elevation, apron means mounted upon said frame and operable upon the location of said uppermost layer of articles at said selected elevation to move from a retracted position clear of the front side of said lift shaft rearwardly across said shaft to an extended position by passing beneath said uppermost layer of articles, a stationary back-up member mounted upon said frame and extending across the rear side of said shaft to engage the rear side of said uppermost layer of articles to prevent movement of said uppermost layer of articles away from said apron means during movement of said apron means toward said extended position, alignment means mounted upon said frame and extending across the rear side of said shaft below said back-up member and operable upon rearward movement of said apron means to drive the rear side of the layer of articles immediately below said uppermost layer to a location forwardly of said stationary back-up member, and movable back-up means mounted upon said frame and extending across said rear side of said shaft above said stationary back-up member for driving articles supported upon said apron when in said extended position away from said rear side of said shaft.

12. Apparatus for unstacking a stack of articles comprising a frame, lift means for positioning a stack of articles within a lift shaft defined by said frame with the uppermost layer of articles in the stack located at a selected elevation, apron means mounted on said frame and operable upon the location of said uppermost layer of articles at said selected elevation to move from a retracted position clear of the front side of said lift shaft rearwardly across said shaft to an extended position by passing beneath said uppermost layer of articles, a stationary back-up member mounted upon said frame and extending across said rear side of said shaft to engage the rear side of said uppermost layer of articles to prevent movement of said uppermost layer of articles away from said apron means during movement of said apron means toward said extended position, and a movable back-up assembly mounted upon said frame for reciprocating movement between a normal position located above and behind said stationary back-up member and an actuated position located above and forwardly of said stationary back-up member, and means responsive to the approach of said apron means to said extended position for driving said movable backup assembly from said normal position to said actuated position.

13. Apparatus as defined in claim 12 wherein said stationary back-up member comprises a roller mounted for rotation about an axis extending horizontally across said rear side of said shaft, said movable back-up assembly comprising a horizontally reciprocable frame, a plate extending across said rear side of said shaft, means mounting said plate upon said reciprocable frame for pivotal movement about a horizontal axis extending along the lower edge of said plate, means for locating said plate in a rearwardly and upwardly inclined position when said assembly is in said normal position, and means for pivoting said plate into a vertical position upon movement of said plate from said normal to said actuated position.

14. Apparatus for unloading articles stacked in layers upon a pallet comprising a frame, pallet lift means for raising and lowering pallets within a lift shaft defined by said frame, pallet handling means for removing an unloaded pallet from said lift means when said lift means is at its lowermost position and subsequently locating a loaded pallet upon said lift means, apron means mounted upon said frame for movement along a path extending between a retracted position clear of one side of said lift shaft and an extended position overlying the upper end of said lift shaft, and control means operable in repeated cycles initiated by the location of said apron in said retracted position to position said lift means within said shaft to locate the uppermost layer of articles supported upon said lift in the path of said apron, drive said apron to said extended position by passing said apron beneath said uppermost layer of articles, and return said apron to said retracted position with said uppermost layer of articles supported thereon.

15. Apparatus as defined in claim 13 wherein said pallet handling means includes means for storing a supply of loaded pallets in position to be conveyed to said lift means, said control means including means responsive to the removal of the lowermost layer of articles from a pallet supported upon said lift means for lowering said lift means to said lowermost position, and means responsive to the arrival of said lift means at said lowermost position for releasing a loaded pallet from said storage means and conveying said loaded pallet to said lift means.

16. In an apparatus for unstacking a multilayer stack of box-like articles; a layer remover comprising an apron having a generally planar article supporting surface adapted to support a layer of the stack, roller means extending across the front of said apron and supported upon said apron for rotation about an axis extending across said front of said apron, means for driving said roller means in rotation about said axis in a direction driving articles engaged by said roller means upwardly and rearwardly onto said planar supporting surface of said apron, means supporting said apron for forward and rearward reciprocatory movement between a first location at the rearward side of the stack of articles and a second location underlying a layer of articles at the top of the stack to transfer the layer of articles onto said planar supporting surface of said apron and remove the layer from said stack, and abutment means engageable with the forward side of the uppermost layer of articles in the stack for holding the uppermost layer against forward movement as said apron is moved forwardly from said first location to said second location, means operable when said apron is at said first location for positioning the uppermost layer of the stack of articles between said roller means and said abutment means, and means responsive to the aforementioned positioning of said stack for reciprocating said apron from said first location to said second location to transfer the layer of articles onto said apron and to return said apron to said first location with the layer of articles supported thereon.

17. In an apparatus for unstacking a multi-layer stack of box-like articles; a layer remover comprising an apron adapted to support a layer of a stack, roller means extending across the front of said apron and supported upon said apron for rotation about an axis extending across said front of said apron, means for driving said roller means in rotation about said axis in a direction driving articles engaged by said roller means upwardly and rearwardly onto said apron, means supporting said apron for forward and rearward reciprocatory movement between a first location at the rearward side of the stack of articles and a second location underlying a layer of articles at the top of the stack to transfer the layer of articles onto said apron and remove the layer from said stack, abutment means engageable with the forward side of the uppermost layer of articles in the stack for holding the uppermost layer against forward movement as said apron is moved forwardly from said first location to said second location, means operable once the apron is at said first location for positioning the uppermost layer of the stack of articles between said roller means and said abutment means, means responsive to the aforementioned positioning of said stack for reciprocating said apron from said first location to said second location to transfer the layer of articles onto said apron and to return said apron to said first location with the layer of articles supported thereon, an accumulation table disposed in underlying relationship with said apron when said apron is at said first location to receive a layer of articles from said apron as the layer is pushed from said apron by a subsequent layer of articles transferred from the stack to said apron during movement of said apron from said first to said second location, and means on the rear of said apron for pushing a layer of articles from said accumulation table upon movement of said apron from said second to said first location.

18. In an apparatus for unstacking a multi-layer stack of box-like articles; a layer remover comprising an apron adapted to support a layer of the stack, roller means extending across the front of said apron and supported upon said apron for rotation about an axis extending across said front of said apron, means for driving said roller means in rotation about said axis in a direction driving articles engaged by said roller means upwardly and rearwardly onto said apron, means supporting said apron for forward and rearward reciprocatory movement between a first location at the rearward side of the stack of articles and a second location underlying a layer of articles at the top of the stack to transfer the layer of articles onto said apron and remove the layer from said stack, an abutment means engageable with the forward side of the uppermost layer of articles in the stack for holding the uppermost layer against forward movement as said apron is moved forwardly from said first location to said second location, an accumulation table disposed in underlying relationship with said apron when said apron is at said first location to receive a layer of articles from said apron as the layer is pushed from said apron by a subsequent layer of articles transferred from the stack to said apron during movement of said apron from said first to said second location, and means on the rear of said apron for pushing a layer of articles from said accumulation table upon movement of said apron from said second to said first location.

References Cited by the Examiner

UNITED STATES PATENTS

| | | | |
|---|---|---|---|
| 2,609,109 | 9/52 | Ardell | 214—309 |
| 2,774,489 | 12/56 | Guigas | 214—8.5 X |
| 2,956,697 | 10/60 | Madden. | |
| 3,022,905 | 2/62 | Lyon. | |
| 3,070,241 | 12/62 | Johnston. | |
| 3,107,794 | 10/63 | Bechtold. | |
| 3,113,683 | 12/63 | Von Gal. | |

HUGO O. SCHULZ, *Primary Examiner.*

MORRIS TEMIN, *Examiner.*